(12) United States Patent
Shey et al.

(10) Patent No.: US 12,304,280 B2
(45) Date of Patent: May 20, 2025

(54) HEAT PUMP FOR A VEHICLE

(71) Applicant: Ford Global Technologies, LLC, Dearborn, MI (US)

(72) Inventors: Rachael Shey, Ferndale, MI (US); Jeffrey Paul Brown, Farmington Hills, MI (US); Loren John Lohmeyer, Monroe, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/652,145

(22) Filed: May 1, 2024

(65) Prior Publication Data

US 2024/0278620 A1    Aug. 22, 2024

Related U.S. Application Data

(62) Division of application No. 17/550,180, filed on Dec. 14, 2021, now Pat. No. 12,017,509.

(51) Int. Cl.
*B60H 1/00* (2006.01)
*B60H 1/32* (2006.01)

(52) U.S. Cl.
CPC ..... *B60H 1/00921* (2013.01); *B60H 1/00885* (2013.01); *B60H 1/32284* (2019.05); *B60H 2001/00928* (2013.01); *B60H 2001/00942* (2013.01); *B60H 2001/00957* (2013.01)

(58) Field of Classification Search
CPC ............ B60H 1/00921; B60H 1/00885; B60H 1/32284; B60H 2001/00928; B60H 2001/00942; B60H 2001/00957; B60H 1/323; B60H 1/32; B60H 1/00321; B60H 1/00485; B60H 1/3204
See application file for complete search history.

(56) References Cited

U.S. PATENT DOCUMENTS

| | | | |
|---|---|---|---|
| 6,047,770 | A | 4/2000 | Takeuchi et al. |
| 6,347,528 | B1 | 2/2002 | Iritani et al. |
| 6,477,857 | B2 | 11/2002 | Takeuchi et al. |
| 6,523,365 | B2 | 2/2003 | Zhang et al. |
| 6,574,987 | B2 | 6/2003 | Takeuchi et al. |
| 6,920,922 | B2 | 7/2005 | Takeuchi |

(Continued)

FOREIGN PATENT DOCUMENTS

EP    3053778 B1    10/2019

*Primary Examiner* — Ljiljana V. Ciric
(74) *Attorney, Agent, or Firm* — Vichit Chea; Price Heneveld LLP

(57) ABSTRACT

A heat pump includes a refrigerant loop. The refrigerant loop includes an accumulator having an inlet and an outlet, a compressor, a first heat exchanger, and a first coupling point. The compressor includes a low-pressure inlet and an outlet. The low-pressure inlet is downstream of the outlet of the accumulator. The first heat exchanger includes an inlet and an outlet. The first coupling point is positioned immediately downstream of the outlet of the accumulator and immediately upstream of the low-pressure inlet of the compressor. The first coupling point is immediately downstream of the outlet of the first heat exchanger such that a first heat exchange fluid circulating through the refrigerant loop is directed to the low-pressure inlet of the compressor upon exiting the outlet of the first heat exchanger.

14 Claims, 14 Drawing Sheets

(56) References Cited

U.S. PATENT DOCUMENTS

| | | |
|---|---|---|
| 7,779,647 B2 | 8/2010 | Takeuchi et al. |
| 8,047,018 B2 | 11/2011 | Ikegami et al. |
| 8,113,695 B2 | 2/2012 | Meinke et al. |
| 8,156,754 B2 | 4/2012 | Hong et al. |
| 8,419,512 B2 | 4/2013 | Creed et al. |
| 8,627,586 B2 | 1/2014 | Bozio et al. |
| 9,234,683 B2 | 1/2016 | Creed et al. |
| 9,441,865 B2 | 9/2016 | Inaba et al. |
| 9,612,041 B2 | 4/2017 | Kawakami et al. |
| 9,630,474 B2 | 4/2017 | Brodie et al. |
| 9,786,964 B2 | 10/2017 | Takeuchi et al. |
| 9,809,081 B2 | 11/2017 | Suzuki et al. |
| 10,391,835 B2 | 8/2019 | Blatchley et al. |
| 10,465,952 B2 | 11/2019 | He et al. |
| 10,562,446 B2 | 2/2020 | Cannon |
| 10,737,552 B2 | 8/2020 | He et al. |
| 11,472,261 B2 | 10/2022 | Benouali |
| 11,560,042 B2 | 1/2023 | Brown et al. |
| 11,912,105 B2 | 2/2024 | Shey et al. |
| 11,919,368 B2 | 3/2024 | Shey et al. |
| 11,920,834 B2 | 3/2024 | Shey et al. |
| 12,017,509 B2 * | 6/2024 | Shey ................ B60H 1/323 |
| 12,179,556 B2 * | 12/2024 | Shey ................ F25B 41/24 |
| 2012/0017637 A1 | 1/2012 | Nakajo et al. |
| 2012/0280528 A1 | 11/2012 | Dellock et al. |
| 2015/0274066 A1 | 10/2015 | Del Pozo Gonzalez et al. |
| 2019/0061646 A1 | 2/2019 | Huttenlocher |
| 2020/0290429 A1 | 9/2020 | Blatchley et al. |
| 2022/0412611 A1 | 12/2022 | Brown et al. |
| 2023/0126723 A1 | 4/2023 | Shey et al. |
| 2023/0131019 A1 | 4/2023 | Shey et al. |
| 2023/0182535 A1 | 6/2023 | Shey et al. |
| 2023/0194129 A1 | 6/2023 | Shey et al. |
| 2023/0349597 A1 | 11/2023 | Shey et al. |
| 2023/0366591 A1 | 11/2023 | Shey et al. |
| 2024/0278620 A1 * | 8/2024 | Shey ............ B60H 1/00921 |

* cited by examiner

HEAT PUMP FOR A VEHICLE

CROSS-REFERENCE TO RELATED APPLICATION

This application is a divisional of U.S. patent application Ser. No. 17/550,180, now U.S. Pat. No. 12,017,509, filed Dec. 14, 2021, entitled "HEAT PUMP FOR A VEHICLE." The aforementioned related application is hereby incorporated by reference.

FIELD OF THE DISCLOSURE

The present disclosure generally relates to a heat pump. More specifically, the present disclosure relates to a heat pump for a vehicle.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes an accumulator having an inlet and an outlet, a compressor, a first heat exchanger, and a first coupling point. The compressor includes a low-pressure inlet and an outlet. The low-pressure inlet is downstream of the outlet of the accumulator. The first heat exchanger includes an inlet and an outlet. The first coupling point is positioned immediately downstream of the outlet of the accumulator and immediately upstream of the low-pressure inlet of the compressor. The first coupling point is immediately downstream of the outlet of the first heat exchanger such that a first heat exchange fluid circulating through the refrigerant loop is directed to the low-pressure inlet of the compressor upon exiting the outlet of the first heat exchanger.

Embodiments of the first aspect of the invention can include any one or a combination of the following features:
  the first heat exchange fluid that exits the outlet of the first heat exchanger bypasses the accumulator;
  the refrigerant loop further includes a first expansion valve positioned immediately upstream of the inlet of the first heat exchanger;
  the compressor further includes a mid-pressure inlet;
  the refrigerant loop further includes a vapor generator positioned downstream of the outlet of the compressor and upstream of both the low-pressure inlet and the mid-pressure inlet;
  the refrigerant loop further includes a second expansion valve positioned upstream of the vapor generator;
  the refrigerant loop further includes a second heat exchanger, a first region of a third heat exchanger, a fourth heat exchanger, and a fifth heat exchanger;
  the refrigerant loop further includes a first three-way valve positioned downstream of the outlet of the compressor and upstream of an inlet of the second heat exchanger, wherein the first three-way valve is positioned upstream of the first region of the third heat exchanger;
  the refrigerant loop further includes a third expansion valve positioned upstream of the inlet of the second heat exchanger;
  the refrigerant loop further includes a second three-way valve positioned immediately downstream of the third expansion valve, wherein the second three-way valve is positioned upstream of the second heat exchanger;
  the refrigerant loop further includes a first shutoff valve plumbed in series with the second heat exchanger, wherein the first shutoff valve is positioned downstream of the second heat exchanger;
  the refrigerant loop further includes a second shutoff valve plumbed in series with the vapor generator, wherein the second shutoff valve is positioned downstream of the vapor generator;
  the refrigerant loop further includes a third shutoff valve plumbed in series with the second heat exchanger, wherein the third shutoff valve is positioned downstream of the second heat exchanger;
  the refrigerant loop further includes a fourth shutoff valve plumbed in series with the second heat exchanger, wherein the fourth shutoff valve is positioned downstream of the second heat exchanger; and
  a coolant loop that includes a second region of the third heat exchanger, a pump, a sixth heat exchanger, a seventh heat exchanger, a reservoir, and a coolant network of conduits that fluidly couples components of the coolant loop.

According to a second aspect of the present disclosure, a heat pump includes a refrigerant loop. The refrigerant loop includes an accumulator having an inlet and an outlet, a compressor, a first heat exchanger, a second heat exchanger, a third heat exchanger, a fourth heat exchanger, a first region of a third heat exchanger, a first expansion valve, and a first coupling point. The compressor includes a low-pressure inlet, a mid-pressure inlet, and an outlet. The low-pressure inlet is downstream of the outlet of the accumulator. The first heat exchanger includes an inlet and an outlet. The first expansion valve is positioned immediately upstream of the inlet of the first heat exchanger. The first coupling point is positioned immediately downstream of the outlet of the accumulator and immediately upstream of the low-pressure inlet of the compressor. The first coupling point is immediately downstream of the outlet of the first heat exchanger such that a first heat exchange fluid circulating through the refrigerant loop is directed to the low-pressure inlet of the compressor upon exiting the outlet of the first heat exchanger. The first heat exchange fluid that exits the outlet of the first heat exchanger bypasses the accumulator.

Embodiments of the second aspect of the present disclosure can include any one or a combination of the following features:
  the refrigerant loop further includes a vapor generator positioned downstream of the outlet of the compressor and upstream of both the low-pressure inlet and the mid-pressure inlet, as well as a second expansion valve positioned upstream of the vapor generator;
  the refrigerant loop further includes a first shutoff valve plumbed in series with the second heat exchanger, wherein the first shutoff valve is positioned downstream of the second heat exchanger; a second shutoff valve plumbed in series with the vapor generator, wherein the second shutoff valve is positioned downstream of the vapor generator; a third shutoff valve plumbed in series with the second heat exchanger, wherein the third shutoff valve is positioned downstream of the second heat exchanger; and a fourth shutoff valve plumbed in series with the second heat exchanger, wherein the fourth shutoff valve is positioned downstream of the second heat exchanger;
  the refrigerant loop further includes a first three-way valve positioned downstream of the outlet of the compressor and upstream of an inlet of the second heat exchanger, wherein the first three-way valve is positioned upstream of the first region of the third heat exchanger; a third expansion valve positioned upstream of the inlet of the second heat exchanger; and a second three-way valve positioned immediately downstream of the third expansion valve, wherein the second three-way valve is positioned upstream of the second heat exchanger; and a coolant loop that includes a second region of the third heat exchanger, a pump, a sixth heat exchanger, a seventh heat exchanger, a reservoir, and a coolant network of conduits that fluidly couples components of the coolant loop.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
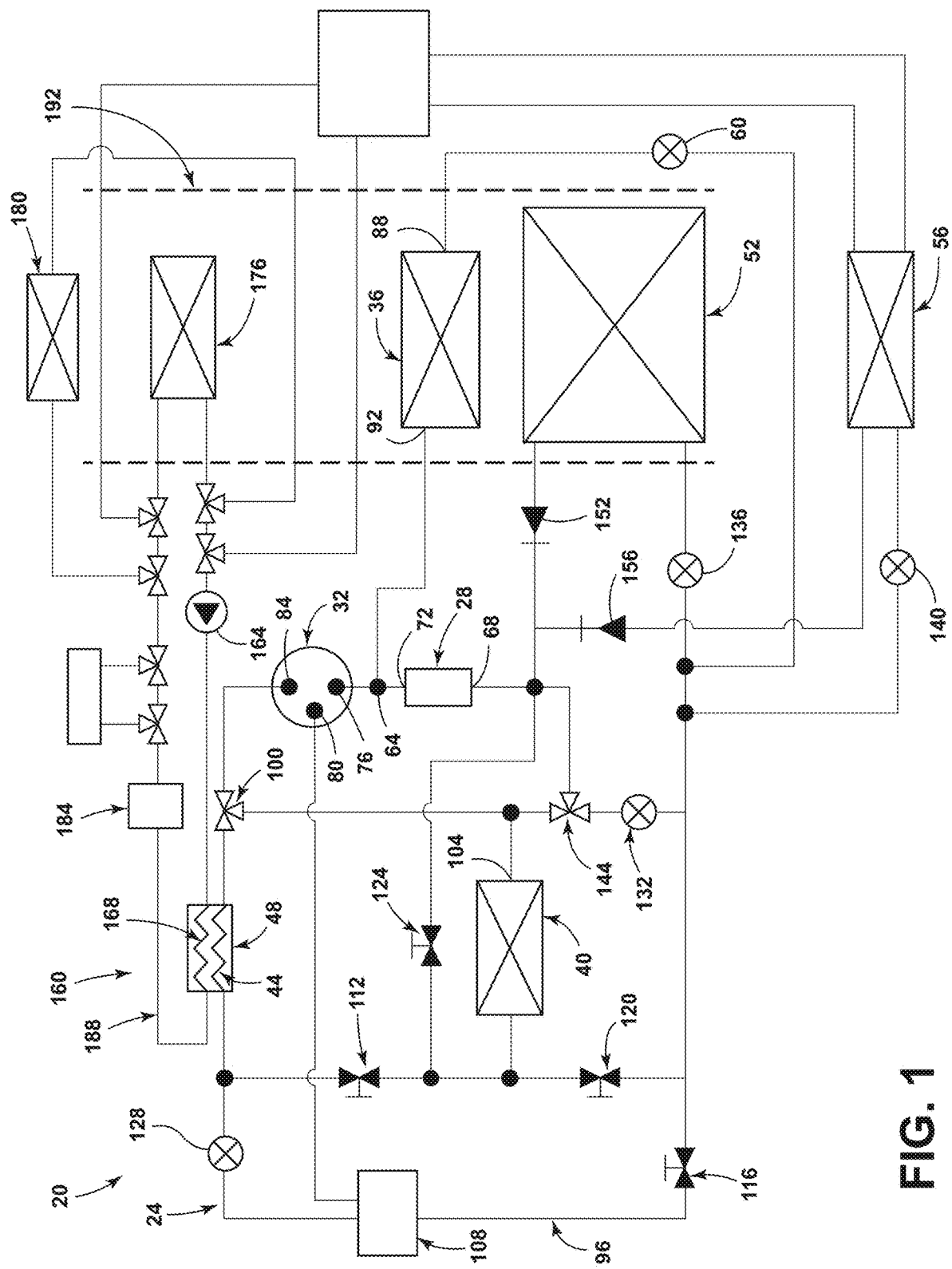
FIG. 1 is a schematic representation of a heat pump arrangement, illustrating a refrigerant loop and a coolant loop, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-14, reference numeral 20 generally designates a heat pump. The heat pump 20 includes a refrigerant loop 24. The refrigerant loop 24 includes an accumulator 28, a compressor 32, a first heat exchanger 36, a second heat exchanger 40, a first region 44 of a third heat exchanger 48, a fourth heat exchanger 52, a fifth heat exchanger 56, a first expansion valve 60, and a first coupling point 64. The accumulator 28 includes an inlet 68 and an outlet 72. The compressor 32 includes a low-pressure inlet 76, a mid-pressure inlet 80, and an outlet 84. The low-pressure inlet 76 is downstream of the outlet 72 of the accumulator 28. The first heat exchanger 36 includes an inlet 88 and an outlet 92. The first expansion valve 60 is positioned immediately upstream of the inlet 88 of the first heat exchanger 36. The first coupling point 64 is positioned immediately downstream of the outlet 72 of the accumulator 28 and immediately upstream of the low-pressure inlet 76 of the compressor 32. The first coupling point 64 is immediately downstream of the outlet 92 of the first heat exchanger 36 such that a first heat exchange fluid circulating through the refrigerant loop 24 is directed to the low-pressure inlet 76 of the compressor 32 upon exiting the outlet 92 of the first heat exchanger 36. The first heat exchange fluid that exits the outlet 92 of the first heat exchanger 36 may bypass the accumulator 28. A refrigerant network of conduits 96 fluidly couples the various components of the refrigerant loop 24 with one another. For the sake of brevity and clarity, individual sections of the refrigerant network of conduits 96 will not be discussed unless additional clarity is provided by such discussion. Rather, the flow of the first heat exchange fluid will be described with regard to the interaction between the first heat exchange fluid and the various components of the refrigerant loop 24.

Referring again to FIGS. 1-14, a first three-way valve 100 is positioned downstream of the outlet 84 of the compressor 32 and upstream of an inlet 104 of the second heat exchanger 40. Additionally, the first three-way valve 100 is positioned upstream of the first region 44 of the third heat exchanger 48. In various examples, the accumulator 28 is positioned upstream of the low-pressure inlet 76 of the compressor 32. In some modes of operation, the first heat exchange fluid that exits the accumulator 28 by way of the outlet 72 thereof is next received by the low-pressure inlet 76 after passing through the first coupling point 64. The accumulator 28 may be a suction accumulator. In general, the accumulator 28 can protect the compressor 32 from liquid slugging or liquid being introduced into the compressor 32. The accumulator 28 can also retain moisture and contaminants from the refrigerant loop 24 and ensure that only refrigerant, such as the first heat exchange fluid, is returning to the compressor 32. It is contemplated that a receiver-dryer may be used in place of the accumulator 28 or in addition to the accumulator 28. In examples that employ the receiver-dryer, the receiver-dryer can be positioned along the refrigerant loop 24 (e.g., along the refrigerant network of conduits 96). When employed, the receiver-dryer can act as a temporary storage container for the first heat exchange fluid during low system demands when operating the heat pump 20. Additionally, the receiver-dryer can contain a desiccant that is used to absorb moisture (e.g., water) that may have entered the first heat exchange fluid. In some examples, the receiver-dryer may include a filter that can trap debris that may have entered into the refrigerant loop 24 and/or the first heat exchange fluid.

Referring yet again to FIGS. 1-14, a vapor generator 108 is positioned downstream of the outlet 84 of the compressor 32. The vapor generator 108 is upstream of both the low-pressure inlet 76 and the mid-pressure inlet 80. A first shutoff valve 112 is plumbed in series with the second heat exchanger 40 and is positioned downstream of the second heat exchanger 40. A second shutoff valve 116 is plumbed in series with the vapor generator 108. The second shutoff valve 116 is downstream of the vapor generator 108. A third shutoff valve 120 is plumbed in series with the second heat exchanger 40 and is positioned downstream of the second heat exchanger 40. A fourth shutoff valve 124 is plumbed in series with the second heat exchanger 40. The fourth shutoff valve 124 is positioned downstream of the second heat exchanger 40 and upstream of the accumulator 28. For example, the fourth shutoff valve 124 may be positioned immediately upstream of the accumulator 28.

Referring further to FIGS. 1-14, a second expansion valve 128 is positioned upstream of the vapor generator 108. In some examples, the vapor generator 108 is a liquid-gas separator valve. In such examples, the liquid-gas separator valve may perform a thermal phase separation and/or a mechanical phase separation, whereby a gaseous component of the first heat exchange fluid that is circulating through the refrigerant loop 24 is extracted, at least in part. The portion of the gaseous component of the first heat exchange fluid extracted by the liquid-gas separator valve may then be injected into the compressor at the mid-pressure inlet 80, as will be discussed in further detail herein. Additionally, in such examples, the remainder of the first heat exchange fluid, which may contain liquid and/or gas components, is circulated through the refrigerant network of conduits 96 to remaining components of the refrigerant loop 24 for a given mode of operation. This remaining portion of the first heat exchange fluid eventually is directed to the low-pressure inlet 76 of the compressor 32. In alternative examples, the vapor generator 108 may be a plate-style heat exchanger. In such examples, the second expansion valve 128 can be positioned upstream of a first region of the vapor generator 108. For example, the second expansion valve 128 can be positioned immediately upstream of the first region of the vapor generator 108. In such examples, the first region may receive a first portion of the first heat exchange fluid and a second region of the plate-style heat exchanger version of the vapor generator 108 can receive a second portion of the first heat exchange fluid. The first and second portions of the first heat exchange fluid thermally interact with one another to generate vapor or gas for injection into the mid-pressure inlet 80. A third expansion valve 132 is positioned upstream of the inlet 104 of the second heat exchanger 40. A fourth expansion valve 136 is positioned upstream of the fourth heat exchanger 52. A fifth expansion valve 140 is positioned upstream of the fifth heat exchanger 56.

Referring still further to FIGS. 1-14, a second three-way valve 144 is positioned downstream of the third expansion valve 132. For example, the second three-way valve 144 may be positioned immediately downstream of the third expansion valve 132. The second three-way valve 144 is positioned upstream of the second heat exchanger 40. For example the second three-way valve 144 may be positioned immediately upstream of the inlet 104 of the second heat exchanger 40. The second three-way valve 144 is also upstream of the accumulator 28. Accordingly, in some modes of operation, the second three-way valve 144 may direct the first heat exchange fluid that exits the third expansion valve 132 to next flow to the inlet 68 of the accumulator 28. In such a mode of operation, the third shutoff valve 120 is in an open position and the second three-way valve 144 is placed in a position that directs the first heat exchange fluid from an outlet 148 of the third expansion valve 132 to the inlet 68 of the accumulator 28. A first check valve 152 is positioned immediately downstream of the fourth heat exchanger 52. A second check valve 156 is positioned downstream of the fifth heat exchanger 56.

Referring again to FIGS. 1-14, the heat pump 20 can further include a coolant loop 160. The coolant loop 160 includes a pump 164, a second region 168 of the third heat exchanger 48, a sixth heat exchanger 176, a seventh heat exchanger 180, a reservoir 184, and a coolant network of conduits 188 that fluidly couples components of the coolant loop 160. A second heat exchange fluid flows through the coolant network of conduits 188 of the coolant loop 160, as well as the components of the coolant loop 160. The first and second heat exchange fluids thermally interact by way of the third heat exchanger 48. More specifically, as the first and second heat exchange fluids flow through the first region 44 and the second region 168 of the third heat exchanger 48, respectively, the first and second heat exchange fluids thermally interact. In various examples, the first heat exchanger 36, the fourth heat exchanger 52, the sixth heat exchanger 176, and/or the seventh heat exchanger 180 can be in fluid communication with ductwork 192 of a Heating, Ventilation, and Air Conditioning (HVAC) system. In various examples, the ductwork 192 can deliver conditioned air (e.g., heat, cooled, and/or dehumidified) to a front, a middle, and/or a rear of a cabin of a vehicle that is equipped with the heat pump 20. Accordingly, one or more of the heat exchangers described herein (e.g., the first heat exchanger 36, the fourth heat exchanger 52, the sixth heat exchanger 176, and/or the seventh heat exchanger 180) may be employed to alter a temperature of ambient air and provide temperature-controlled air to an environment (e.g., the cabin of the vehicle).

Referring further to FIGS. 1-14, one of the heat exchangers chosen from the first heat exchanger 36 and the fourth heat exchanger 52 may be associated with a front of a cabin of a vehicle while the other of the first heat exchanger 36 and the fourth heat exchanger 52 may be associated with a middle and/or a rear of the cabin of the vehicle. In one example, the fourth heat exchanger 52 may be associated with the ductwork 192 such that air within the ductwork 192 that interacts with the fourth heat exchanger 52 is at least directed to passengers that are seated in the front of the cabin. In such an example, the first heat exchanger 36 may be associated with the ductwork 192 such that air within the ductwork 192 that interacts with the first heat exchanger 36 is at least directed to passengers that are seated in the middle and/or the rear of the cabin. However, the present disclosure is not so limited. It is contemplated that the air that is directed to the front, the middle, and/or the rear of the cabin by the ductwork 192 may interact with the first heat exchanger 36 and/or the fourth heat exchanger 52.

Referring still further to FIGS. 1-14, one of the heat exchangers chosen from the sixth heat exchanger 176 and the seventh heat exchanger 180 may be associated with a front of a cabin of a vehicle while the other of the sixth heat exchanger 176 and the seventh heat exchanger 180 may be associated with a middle and/or a rear of the cabin of the vehicle. In one example, the sixth heat exchanger 176 may be associated with the ductwork 192 such that air within the ductwork 192 that interacts with the sixth heat exchanger 176 is at least directed to passengers that are seated in the front of the cabin. In such an example, the seventh heat exchanger 180 may be associated with the ductwork 192 such that air within the ductwork 192 that interacts with the seventh heat exchanger 180 is at least directed to passengers that are seated in the middle and/or the rear of the cabin. However, the present disclosure is not so limited. It is contemplated that the air that is directed to the front, the middle, and/or the rear of the cabin by the ductwork 192 may interact with the sixth heat exchanger 176 and/or the seventh heat exchanger 180.

Referring now to FIGS. 2-5, a first cabin cooling mode of operation (FIG. 2), a second cabin cooling mode of operation (FIG. 3), a cabin and battery cooling mode of operation (FIG. 4), and a deicing mode of operation (FIG. 5), are each depicted in exemplary form. In each of these modes of operation, the compressor 32 acts upon the first heat exchange fluid to drive the first heat exchange fluid from the outlet 84 toward the first three-way valve 100. More specifically, the compressor 32 drives the first heat exchange fluid toward a first port 196 of the first three-way valve 100. As a result of the positioning of the first three-way valve 100 in these modes of operation, the first heat exchange fluid that is received at the first port 196 is directed to exit the first three-way valve 100 at a second port 200 thereof. After exiting the second port 200 of the first three-way valve 100, the first heat exchange fluid is directed toward the inlet 104 of the second heat exchanger 40. As the first heat exchange fluid flows through the second heat exchanger 40, the first heat exchange fluid may thermally interact with a heat exchange fluid that is external to the refrigerant loop 24 and the coolant loop 160 (e.g., ambient air) such that heat may be removed from the first heat exchange fluid. Alternatively, at the second heat exchanger 40, the first heat exchange fluid may absorb heat from the heat exchange fluid that is external to the refrigerant loop 24 and the coolant loop 160. The flow of heat to or from the first heat exchange fluid at the second heat exchanger 40 depends upon the particular mode of operation and the thermal conditions of the heat exchange fluid that is external to the refrigerant loop 24 and the coolant loop 160. The first heat exchange fluid exits the second heat exchanger 40 at an outlet 204 of the second heat exchanger 40.

Figure 2:
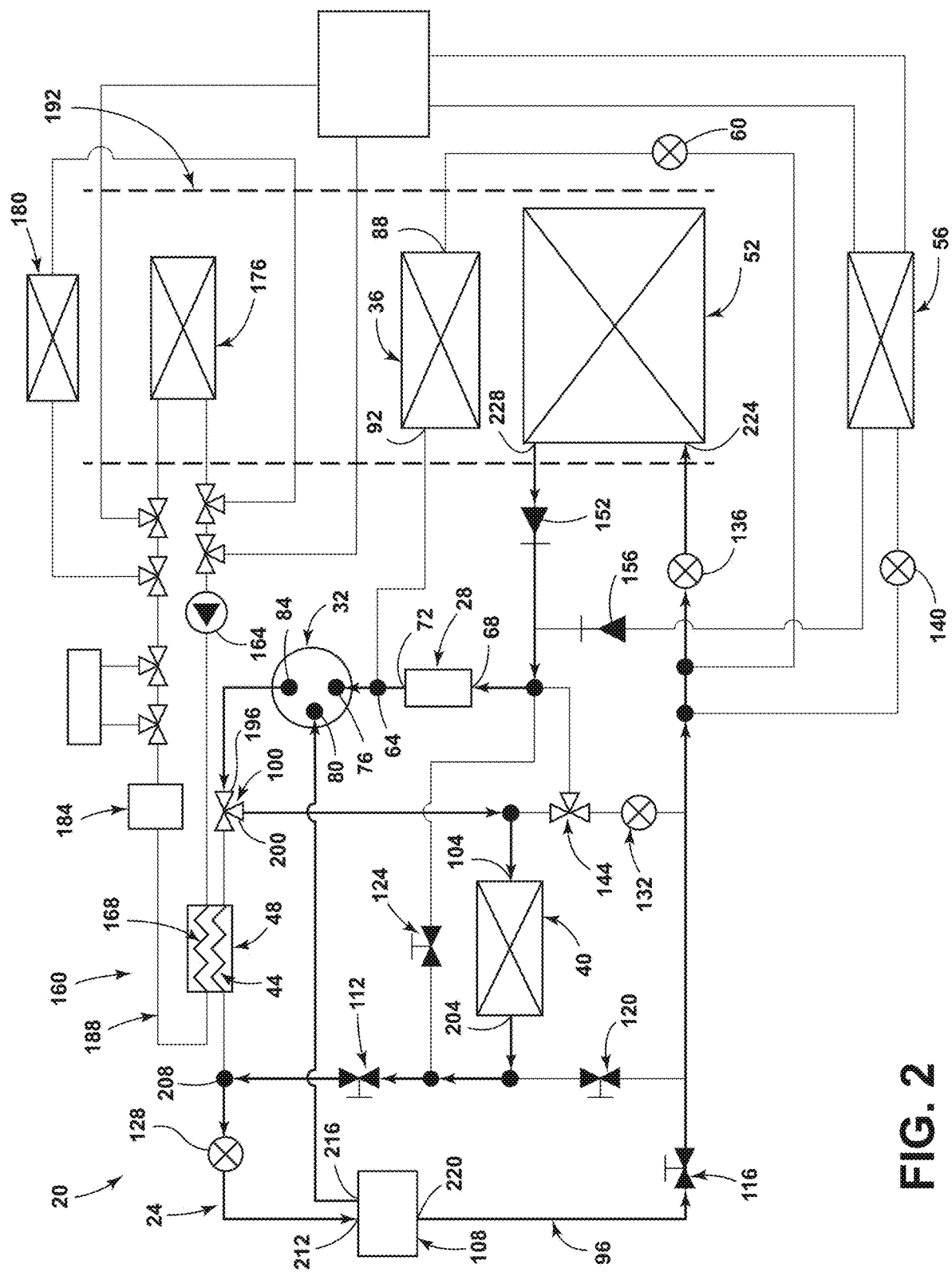
FIG. 2 is a schematic representation of the heat pump arrangement, illustrating a first cabin cooling mode of operation, according to one example.
Figure 3:
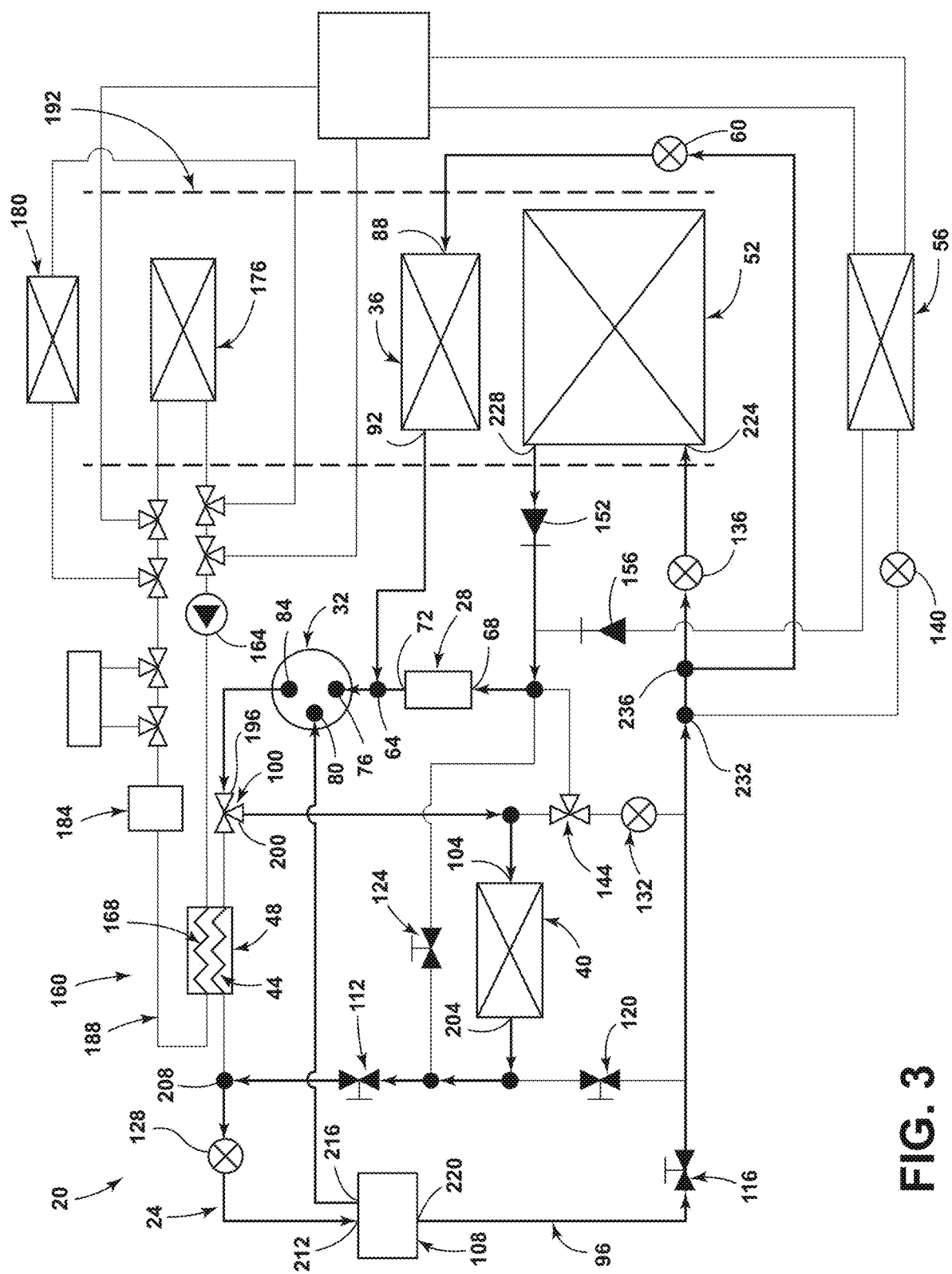
FIG. 3 is a schematic representation of the heat pump arrangement, illustrating a second cabin cooling mode of operation, according to one example.
Figure 4:
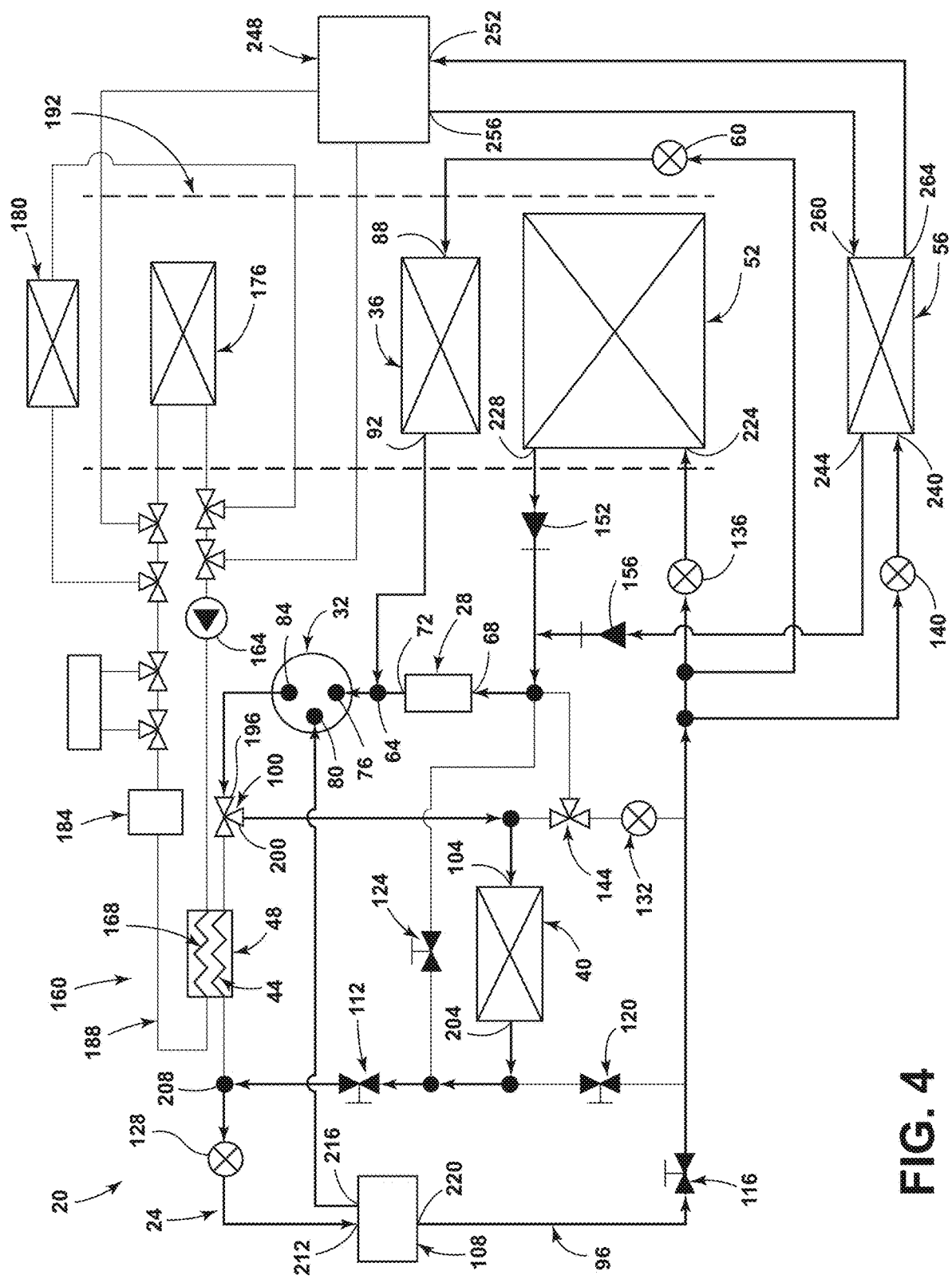
FIG. 4 is a schematic representation of the heat pump arrangement, illustrating a cabin and battery cooling mode of operation, according to one example.

Referring to FIGS. 2-4, the third and fourth shutoff valves 120, 124 are each in a closed position in these modes of operation. Accordingly, upon exiting the second heat exchanger 40 by way of the outlet 204, the first heat exchange fluid is directed toward the first shutoff valve 112. In each of these modes of operation, the first shutoff valve 112 is in an open position. After flowing through the first shutoff valve 112, the first heat exchange fluid passes through a second coupling point 208. The second coupling point 208 is downstream of the first region 44 of the third heat exchanger 48. The second coupling point 208 is upstream of the second expansion valve 128. In various examples, from the second coupling point 208, the first heat exchange fluid is entirely directed to the second expansion valve 128. In such examples, after the entirety of the first heat exchange fluid that interacts with the second coupling point 208 passes through the second expansion valve 128, the first heat exchange fluid is directed toward an inlet 212 of the vapor generator 108. The first heat exchange fluid decreases in pressure and temperature as a result of interaction with the second expansion valve 128. Within the vapor generator 108 that is depicted, at least a portion of the gaseous component of the first heat exchange fluid is separated or removed and directed toward the mid-pressure inlet 80 of the compressor 32. More specifically, the portion of the gaseous component that is separated from the first heat exchange fluid exits the vapor generator 108 by way of a first outlet 216. A remainder of the first heat exchange fluid that did not exit the vapor generator 108 by way of the first outlet 216 is directed toward a second outlet 220 of the vapor generator 108.

Referring again to FIGS. 2-4, in various examples, the gaseous portion of the first heat exchange fluid that is directed toward the first outlet 216 by the vapor generator 108 can be expressed as a ratio or percentage. For example, expressing the ratio as a percentage of the first heat exchange fluid that is diverted toward the first outlet 216, the first outlet 216 can receive about 5%, about 10%, about 15%, about 20%, about 25%, about 30%, about 35%, about 40%, about 45%, about 50%, about 55%, or about 60% of the first heat exchange fluid that enters the vapor generator 108. The remainder, or balancing percentage, of the first heat exchange fluid that encounters the vapor generator 108 and is not diverted toward the first outlet 216 can be directed toward the second outlet 220 of the vapor generator 108. It is contemplated that in different modes of operation of the heat pump 20, the percentage of the first heat exchange fluid that is directed toward the first outlet 216 may vary. Additionally, it is contemplated that up to 100% of the gaseous component of the first heat exchange fluid may be separated and directed toward the first outlet 216. Upon exiting the second outlet 220 of the vapor generator 108, the first heat exchange fluid is directed toward the second shutoff valve 116. The first heat exchange fluid flows through the second shutoff valve 116 as a result of the second shutoff valve 116 being in an open position.

Referring further to FIGS. 2-4, the second three-way valve 144 is placed in a position in these modes of operation that prevents flow after the third expansion valve 132. Accordingly, from the second shutoff valve 116, the first heat exchange fluid is directed toward the fourth expansion valve 136 by the refrigerant network of conduits 96. As with the second expansion valve 128, the first heat exchange fluid experiences a decrease in pressure and temperature as a result of interaction with the fourth expansion valve 136. After exiting the fourth expansion valve 136, the first heat exchange fluid is directed toward an inlet 224 of the fourth heat exchanger 52. The decreased temperature and pressure of the first heat exchange fluid flowing through the fourth heat exchanger 52 can be employed to provide cooling to air that is flowing through the ductwork 192 with which the fourth heat exchanger 52 is in fluid communication. Accordingly, the first heat exchange fluid that exits the fourth heat exchanger 52 by way of an outlet 228 of the fourth heat exchanger 52 may have an increased pressure, temperature, and/or vapor percentage than the first heat exchange fluid that entered the fourth heat exchanger 52 at the inlet 224. Upon exiting the fourth heat exchanger 52 by way of the outlet 228, the first heat exchange fluid flows through the first check valve 152. After exiting the first check valve 152, the first heat exchange fluid is directed toward the accumulator 28 by the refrigerant network of conduits 96. In FIGS. 2 and 3, the second check valve 156 prevents back flow toward the fifth heat exchanger 56 in these modes of operation. Accordingly, the fifth heat exchanger 56 is prevented from becoming a storage vessel for the first heat exchange fluid when the fifth heat exchanger 56 is not employed in a given mode of operation. The accumulator 28 receives the first heat exchange fluid and provides a gaseous component of the first heat exchange fluid to the low-pressure inlet 76 of the compressor 32, thereby completing the traversal of the refrigerant loop 24.

Referring now to FIGS. 3 and 4, as the flow of the first heat exchange fluid from the compressor 32 to the second shutoff valve 116 has been described above, such description here is omitted for brevity. From the second shutoff valve 116, the first heat exchange fluid is directed toward the first expansion valve 60, the fourth expansion valve 136, and/or the fifth expansion valve 140. More specifically, the first heat exchange fluid encounters a second branching point 232 and a third branching point 236 where, depending upon the mode of operation, a portion of the first heat exchange fluid is diverted toward the first expansion valve 60 and/or the fifth expansion valve 140. For example, in the mode of operation depicted in FIG. 3, the first heat exchange fluid encounters the second branching point 232 and is not diverted toward the fifth expansion valve 140. The fifth expansion valve 140 can be capable of operating as a shutoff valve such that the first heat exchange fluid can be prevented from being diverted at the second branching point 232 when the fifth expansion valve 140 is closed or operating as a shutoff valve. Therefore, in the mode of operation depicted in FIG. 3, and amount of the first heat exchange fluid that encounters the second branching point 232 is entirely or substantially maintained and received at the third branching point 236. However, in the mode of operation depicted in FIG. 4, at least a portion of the first heat exchange fluid that encounters the second branching point 232 is diverted toward the fifth expansion valve 140, as will be discussed in further detail herein.

With specific reference to FIG. 3, at the third branching point 236, the first heat exchange fluid is separated into a first portion and a second portion. The first portion of the first heat exchange fluid is directed toward the fourth expansion valve 136 and interacts with the fourth expansion valve 136, the fourth heat exchanger 52, and the first check valve 152 in the manner already described. The second portion of the first heat exchange fluid is diverted toward the first expansion valve 60. The second portion of the first heat exchange fluid experiences a decrease in pressure and temperature as a result of interaction with the first expansion valve 60. After exiting the first expansion valve 60, the first heat exchange fluid is directed toward the inlet 88 of the first heat exchanger 36. The decreased temperature and pressure of the first heat exchange fluid flowing through the first heat exchanger 36 can be employed to provide cooling to air that is flowing through the ductwork 192 with which the first heat exchanger 36 is in fluid communication. Accordingly, the first heat exchange fluid that exits the first heat exchanger 36 by way of the outlet 92 of the first heat exchanger 36 may have an increased pressure, temperature, and/or vapor percentage when compared to the first heat exchange fluid that entered the first heat exchanger 36 at the inlet 88. Upon exiting the first heat exchanger 36 by way of the outlet 92, the second portion of the first heat exchange fluid is directed toward the first coupling point 64 by the refrigerant network of conduits 96. At the first coupling point 64, the first and second portions of the first heat exchange fluid are recombined. The increased pressure, temperature, and/or vapor percentage second portion of the first heat exchange fluid that is received at the first coupling point 64 is directed to the low-pressure inlet 76 of the compressor 32 without passing through the accumulator 28, thereby completing traversal of the refrigerant loop 24. Accordingly, the accumulator 28 may be bypassed in the depicted mode of operation.

With particular reference to FIG. 4, at the second branching point 232, the first heat exchange fluid is separated into a first portion and a second portion. The first portion of the first heat exchange fluid is directed toward the third branching point 236. At the third branching point 236, the first heat exchange fluid is further separated into a third portion and a fourth portion. The third portion of the first heat exchange fluid is directed toward the fourth expansion valve 136 and interacts with the fourth expansion valve 136, the fourth heat exchanger 52, and the first check valve 152 in the manner already described. The fourth portion of the first heat exchange fluid is diverted toward the first expansion valve 60. The first heat exchange fluid experiences a decrease in pressure and temperature as a result of interaction with the first expansion valve 60. After exiting the first expansion valve 60, the fourth portion of the first heat exchange fluid is directed toward the inlet 88 of the first heat exchanger 36. The decreased temperature and pressure of the first heat exchange fluid flowing through the first heat exchanger 36 can be employed to provide cooling to air that is flowing through the ductwork 192 with which the first heat exchanger 36 is in fluid communication. Accordingly, the first heat exchange fluid that exits the first heat exchanger 36 by way of the outlet 92 of the first heat exchanger 36 may have an increased pressure, temperature, and/or vapor percentage than the first heat exchange fluid that entered the first heat exchanger 36 at the inlet 88. Upon exiting the first heat exchanger 36 by way of the outlet 92, the fourth portion of the first heat exchange fluid is directed toward the first coupling point 64 by the refrigerant network of conduits 96. At the first coupling point 64, the fourth portion is recombined with the second and third portions of the first heat exchange fluid. The first portion of the first heat exchange fluid was separated into the third and fourth portions of the first heat exchange fluid at the third branching point 236. Accordingly, the first portion of the first heat exchange fluid is not specifically called-out as being recombined since the component parts of the first portion (i.e., the third and fourth portions) are discussed. Prior to reaching the first coupling point 64, the second and third portions of the first heat exchange fluid have already been recombined with one another and been exposed to the accumulator 28. The increased pressure, temperature, and/or vapor percentage fourth portion of the first heat exchange fluid that is received at the first coupling point 64 is directed to the low-pressure inlet 76 of the compressor 32 without passing through the accumulator 28, thereby completing traversal of the refrigerant loop 24. Accordingly, the accumulator 28 may be bypassed by the fourth portion of the first heat exchange fluid in the depicted mode of operation.

Referring again to FIG. 4, at the second branching point 232, the second portion of the first heat exchange fluid is directed toward the fifth expansion valve 140. The second portion of the first heat exchange fluid experiences a decrease in pressure and temperature as a result of interaction with the fifth expansion valve 140. After exiting the fifth expansion valve 140, the second portion of the first heat exchange fluid is directed toward a first inlet 240 of the fifth heat exchanger 56. The second portion of the first heat exchange fluid that is received at the first inlet 240 can exit the fifth heat exchanger 56 by way of a first outlet 244. The decreased temperature and pressure of the first heat exchange fluid flowing through the fifth heat exchanger 56 can be employed to decrease the temperature of the second heat exchange fluid flowing through the coolant loop 160. The decreased temperature of the second heat exchange fluid can then be employed to decrease the temperature of heat-producing components with which the fifth heat exchanger 56 interacts (e.g., the first heat-producing component 248, electric motors, batteries, electronics, etc.). Accordingly, the first heat exchange fluid that exits the fifth heat exchanger 56 by way of the first outlet 244 of the fifth heat exchanger 56 may have an increased pressure, temperature, and/or vapor percentage when compared to the first heat exchange fluid that entered the fifth heat exchanger 56 at the first inlet 240. Upon exiting the fifth heat exchanger 56 by way of the first outlet 244, the first heat exchange fluid is directed toward the second check valve 156 by the refrigerant network of conduits 96. Once the first heat exchange fluid has passed through the first and second check valves 152, 156, the first portion of the first heat exchange fluid that was directed toward the fourth heat exchanger 52 is rejoined or recombined with the second portion of the first heat exchange fluid that was directed toward the fifth heat exchanger 56. From the first and second check valves 152, 156, the first heat exchange fluid is directed toward the accumulator 28. The accumulator 28 receives the first heat exchange fluid and provides a gaseous component of the first heat exchange fluid to the low-pressure inlet 76 of the compressor 32.

Referring further to FIG. 4, the second heat exchange fluid flows between the fifth heat exchanger 56 and the first heat-producing component 248. More specifically, a first inlet 252 of the first heat-producing component 248 receives the second heat exchange fluid from the fifth heat exchanger 56. The first heat-producing component 248 can be an engine, electronics, battery, battery pack, one or more heating elements, brakes, or the like. The second heat exchange fluid received at the first inlet 252 of the first heat-producing component 248 can decrease a temperature of the first heat-producing component 248. More specifically, the decreased temperature, pressure, and/or vapor percentage provided to the first heat exchange fluid flowing through the fifth heat exchanger 56 as a result of interaction with the fifth expansion valve 140 can be employed for thermal exchange with the second heat exchange fluid. Accordingly, the second heat exchange fluid that exits the fifth heat exchanger 56 may have a decreased temperature, pressure, and/or vapor percentage when compared to the second heat exchange fluid that entered the fifth heat exchanger 56. Therefore, the second heat exchange fluid that exits the first heat-producing component 248 by way of a first outlet 256 thereof may have a greater pressure, temperature, and/or vapor percentage than the second heat exchange fluid that was received at the first inlet 252. The first heat-producing component 248 is further plumbed to the coolant loop 160, as will be discussed in further detail herein.

Referring still further to FIG. 4, from the first outlet 256 of the first heat-producing component 248, the second heat exchange fluid is directed toward a second inlet 260 of the fifth heat exchanger 56. The first heat exchange fluid received at the first inlet 240 and the second heat exchange fluid received at the second inlet 260 can thermally interact with one another within the fifth heat exchanger 56. The second heat exchange fluid that is received at the second inlet 260 exits the fifth heat exchanger 56 by way of a second outlet 264 thereof. From the second outlet 264 of the fifth heat exchanger 56, the second heat exchange fluid is directed back toward the first inlet 252 of the first heat-producing component 248.

Referring yet again to FIG. 4, the accumulator 28 receives the second and third portions of the first heat exchange fluid and provides a gaseous component of the first heat exchange fluid to the low-pressure inlet 76 of the compressor 32. On the way to the low-pressure inlet 76, the gaseous component of the first heat exchange fluid that exits the outlet 72 of the accumulator 28 encounters the first coupling point 64. At the first coupling point 64, the gaseous component of the first heat exchange fluid that exited the outlet 72 of the accumulator 28 is recombined with the fourth portion of the first heat exchange fluid prior to reaching the low-pressure inlet 76 of the compressor 32. From the first coupling point 64, the first heat exchange fluid is directed to the low-pressure inlet 76 of the compressor 32, thereby completing the traversal of the refrigerant loop 24 in the depicted mode of operation.

Figure 5:
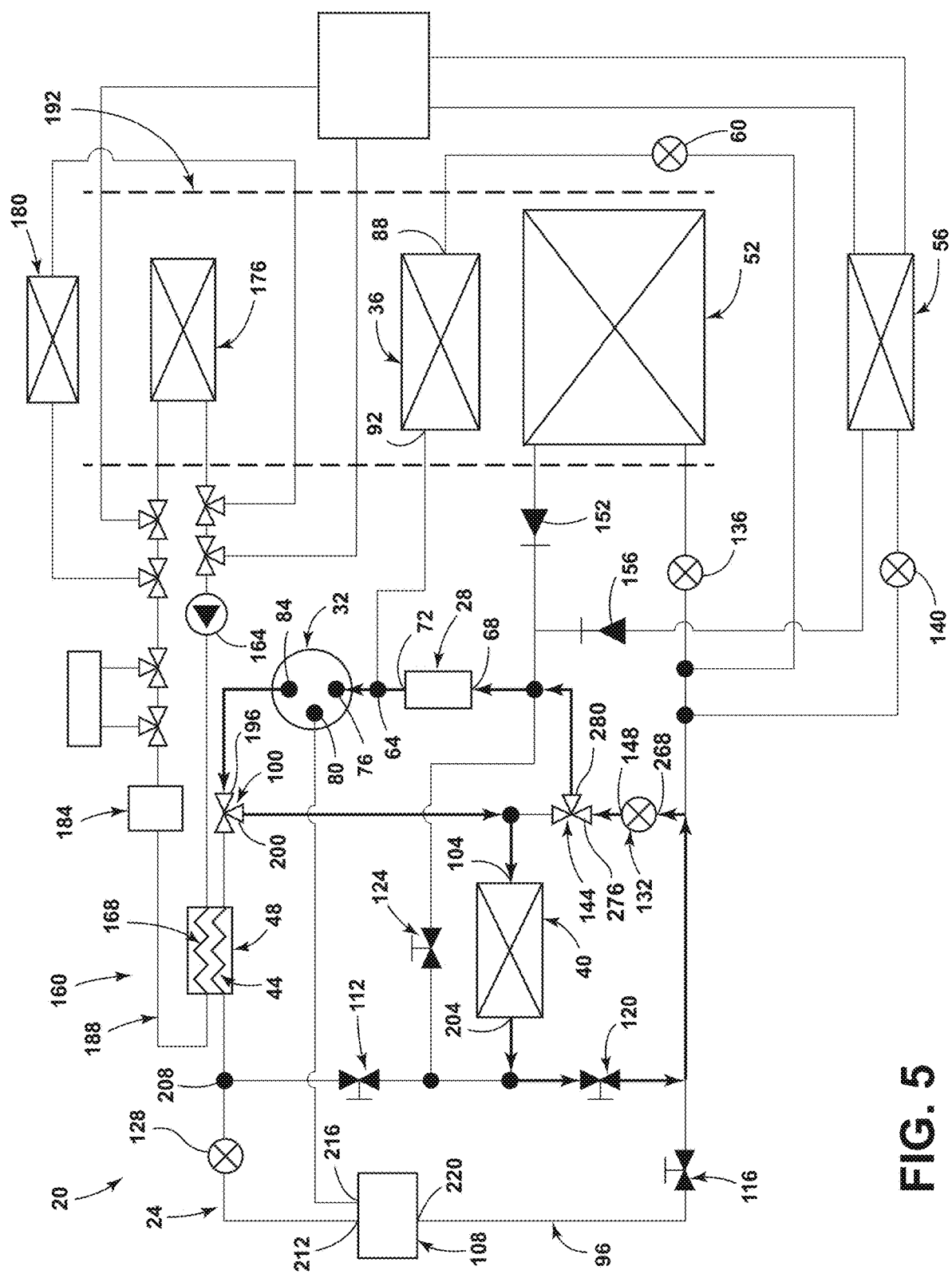
FIG. 5 is a schematic representation of the heat pump arrangement, illustrating a deicing mode of operation, according to one example.

Referring now to FIG. 5, the flow of the first heat exchange fluid from the outlet 84 of the compressor 32 to the second heat exchanger 40, and through the second heat exchanger 40 has been described above and is omitted here for the sake of brevity. The first shutoff valve 112, the second shutoff valve 116, and the fourth shutoff valve 124 are each in a closed position in the depicted mode of operation. However, the third shutoff valve 120 is in an open position in the depicted mode of operation. Accordingly, upon exiting the second heat exchanger 40 by way of the outlet 204 thereof, the first heat exchange fluid is directed toward the third shutoff valve 120. The first, fourth, and fifth expansion valves 60, 136, 140 each operate as shutoff valves in this mode of operation. Therefore, from the third shutoff valve 120, the first heat exchange fluid is directed toward the third expansion valve 132. The first heat exchange fluid is received at an inlet 268 of the third expansion valve 132. The first heat exchange fluid exits the third expansion valve 132 by way of an outlet 148 thereof. The first heat exchange fluid experiences a decreases in pressure and temperature as a result of interaction with the third expansion valve 132.

Referring again to FIG. 5, the second three-way valve 144 is positioned immediately downstream of the third expansion valve 132 and immediately upstream of the accumulator 28. The second three-way valve 144 directs the first heat exchange fluid from the outlet 148 of the third expansion valve 132 to the inlet 68 of the accumulator 28 during this mode of operation. More specifically, the first heat exchange fluid that exits the third expansion valve 132 by way of the outlet 148 thereof is received at a first port 276 of the second three-way valve 144. Based upon the positioning of the second three-way valve 144 in this mode of operation, the first heat exchange fluid received at the first port 276 is directed to exit the second three-way valve 144 by way of a second port 280. From the second port 280, the first heat exchange fluid is directed to the inlet 68 of the accumulator 28. The first and second check valves 152,156 prevent back flow toward the fourth and fifth heat exchangers 52, 56, respectively. Accordingly, the fourth and fifth heat exchangers 52, 56 are prevented from becoming storage vessels for the first heat exchange fluid when the fourth and fifth heat exchangers 52, 56 are not employed in a given mode of operation. The accumulator 28 performs as described above and provides a gaseous component of the first heat exchange fluid to the low-pressure inlet 76 of the compressor 32, thereby completing traversal of the refrigerant loop 24 in this mode of operation. The depicted mode of operation may be referred to as a deicing mode of operation.

Figure 9:
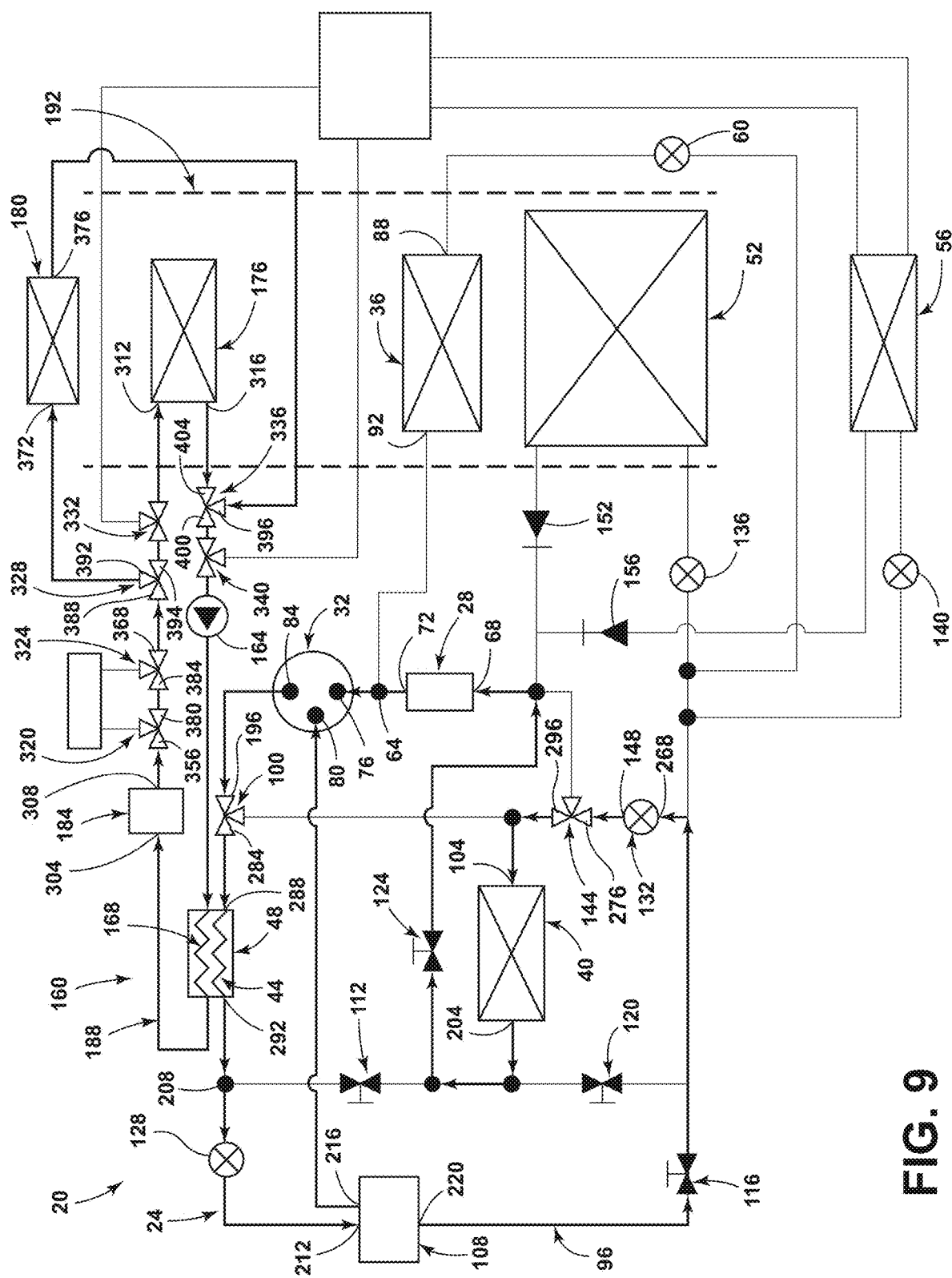
FIG. 9 is a schematic representation of the heat pump arrangement, illustrating a second heating mode of operation, according to one example.
Figure 10:
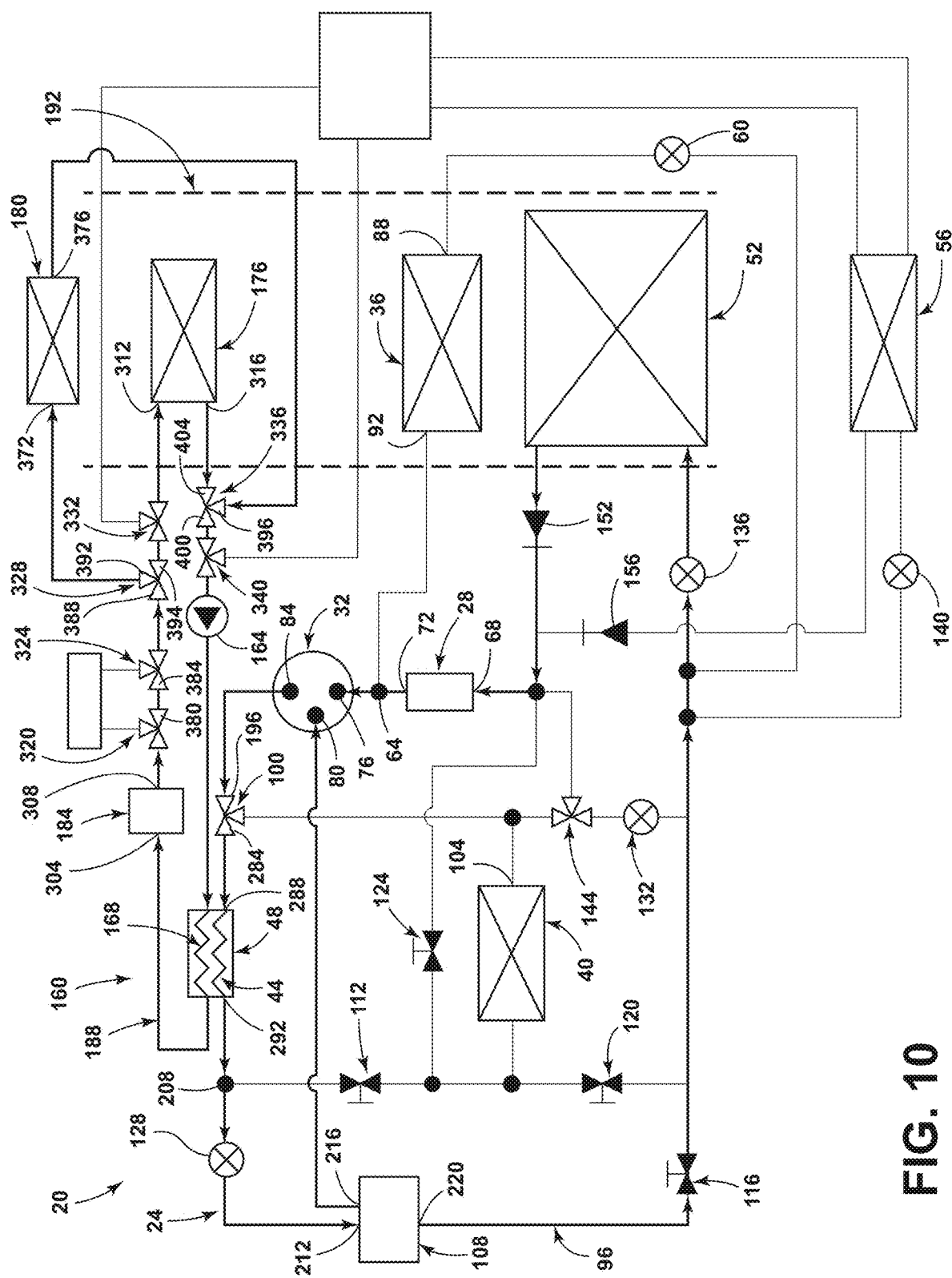
FIG. 10 is a schematic representation of the heat pump arrangement, illustrating a third reheat mode of operation, according to one example.
Figure 11:
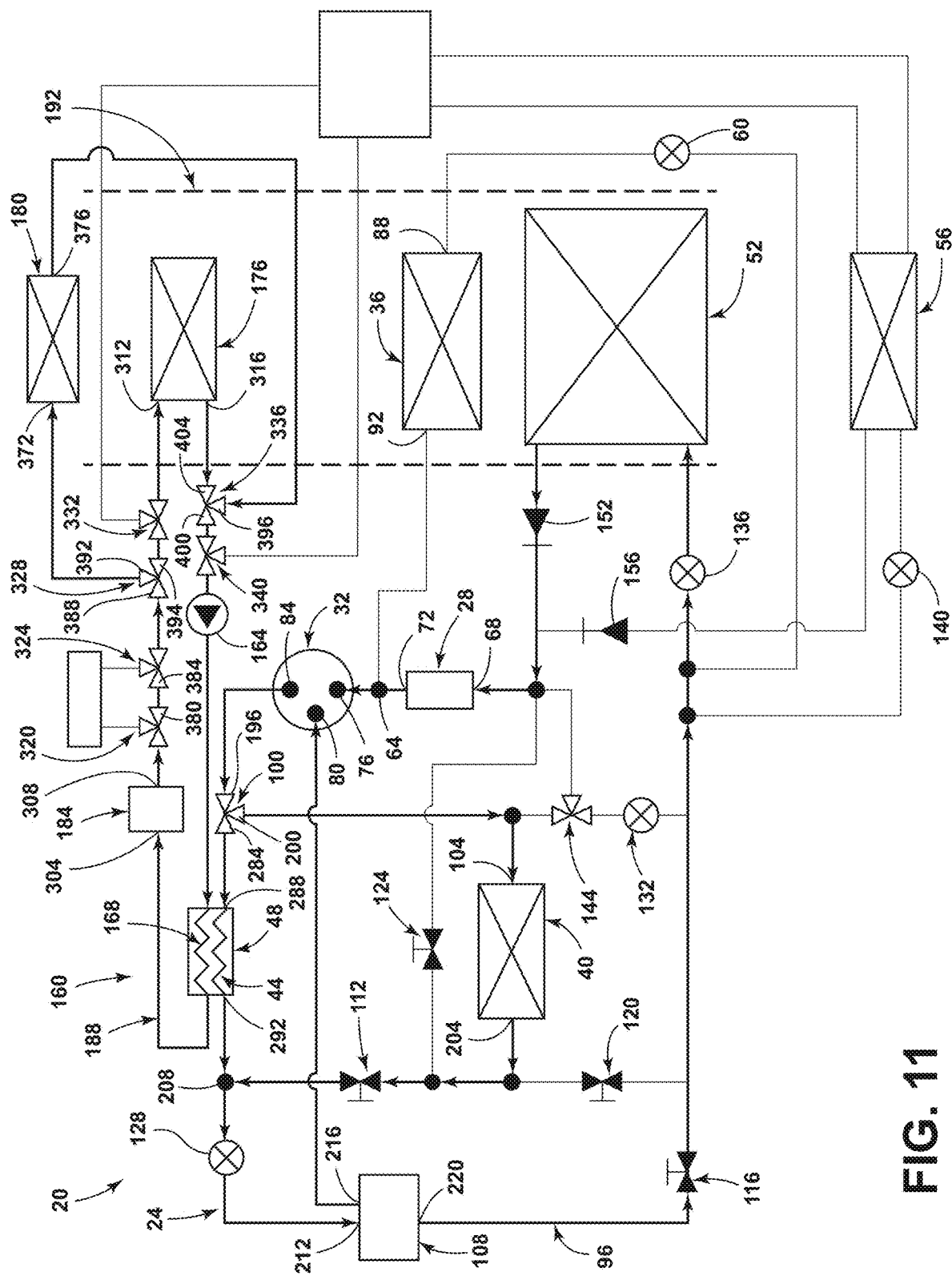
FIG. 11 is a schematic representation of the heat pump arrangement, illustrating a reheat and de-ice mode of operation, according to one example.

Referring to FIGS. 6-12 and 14, the compressor 32 acts upon the first heat exchange fluid to drive the first heat exchange fluid from the outlet 84 of the compressor 32 toward the first port 196 of the first three-way valve 100. The positioning of the first three-way valve 100 in these modes of operation depicted in FIGS. 6-10, 12, and 14 is such that an entirety of the first heat exchange fluid that is received at the first port 196 is directed out of a third port 284 of the first three-way valve 100. The positioning of the first three-way valve 100 in the mode of operation depicted in FIG. 11 is such that a first portion of the first heat exchange fluid that is received at the first port 196 is directed out of the second port 200 and a second portion of the first heat exchange fluid that is received at the first port 196 is directed out of the third port 284, as will be discussed in further detail herein. In each of the modes of operation depicted in FIGS. 6-10, 12, and 14, from the third port 284 of the first three-way valve 100, the first heat exchange fluid is directed toward an inlet 288 of the first region 44 of the third heat exchanger 48. After thermally interacting with the second heat exchange fluid in the third heat exchanger 48, the first heat exchange fluid exits the first region 44 of the third heat exchanger 48 by way of an outlet 292 of the first region 44. Upon exiting the first region 44 of the third heat exchanger 48, the first heat exchange fluid is directed toward the second coupling point 208. At the second coupling point 208, the first heat exchange fluid is prevented from flowing toward the first shutoff valve 112 by the first shutoff valve 112 being in a closed position (FIGS. 6-10, 12, and 14) or by a pressure of the first heat exchange fluid flowing from the first shutoff valve 112 (FIG. 11). From the second coupling point 208, the first heat exchange fluid is directed toward the second expansion valve 128. The interaction of the first heat exchange fluid with the second expansion valve 128 and the vapor generator 108 has been described above and is omitted here for the sake of brevity. From the vapor generator 108, the first heat exchange fluid is directed toward the second shutoff valve 116.

With specific reference to FIGS. 10 and 11, the second three-way valve 144 is placed in a position in these modes of operation that prevents flow after the third expansion valve 132. Additionally, in FIGS. 10 and 11, from the second shutoff valve 116, the first heat exchange fluid is directed toward the fourth expansion valve 136. The fourth expansion valve 140 acts as a shutoff valve in these modes of operation such that the first heat exchange fluid is prevented from entering the fifth heat exchanger 56. From the fourth expansion valve 136, the first heat exchange fluid is directed to the fourth heat exchanger 52. The fourth heat exchanger 52 performs as already described. From the fourth heat exchanger 52, the first heat exchange fluid is directed through the first check valve 152 and ultimately to the accumulator 28. The second check valve 156 prevents back flow toward the fifth heat exchanger 56. Accordingly, the fifth heat exchanger 56 is prevented from becoming a storage vessel for the first heat exchange fluid when the fifth heat exchanger 56 is not employed in a given mode of operation.

Referring now to FIGS. 6-9, 12, and 14, from the second shutoff valve 116, the first heat exchange fluid is directed toward the third expansion valve 132. In the mode of operation depicted in FIG. 7, from the second shutoff valve 116, the first heat exchange fluid is directed toward the third expansion valve 132 and the fourth expansion valve 136, as will be discussed in further detail herein. In each of the modes of operation, the first expansion valve 60 and the fifth expansion valve 140 are each operated as a shutoff valve. In the modes of operation depicted in FIGS. 6, 8-9, 12, and 14, the fourth expansion valve 136 is also operated as a shutoff valve. At the third expansion valve 132, the first heat exchange fluid experiences a decrease in temperature and pressure. From the third expansion valve 132, the first heat exchange fluid is directed toward the first port 276 of the second three-way valve 144. Based upon a positioning of the second three-way valve 144, the first heat exchange fluid received at the first port 276 is directed out of a third port 296 thereof. From the third port 296, the first heat exchange fluid is directed toward the inlet 104 of the second heat exchanger 40. Within the second heat exchanger 40, the first heat exchange fluid may absorb heat from fluid with which the second heat exchanger 40 is additionally in contact (e.g., ambient air that is exterior to a vehicle). The first and third shutoff valves 112, 120 are each in a closed position in these modes of operation. However, the fourth shutoff valve 124 is in an open position in these modes of operation, which results in the first heat exchange fluid being directed toward the accumulator 28 upon exiting the second heat exchanger 40 by way of the outlet 204 thereof. With regard to FIGS. 6, 8, 9, 12, and 14, the first and second check valves 152,156 prevent back flow toward the fourth and fifth heat exchangers 52, 56, respectively. Accordingly, the fourth and fifth heat exchangers 52, 56 are prevented from becoming storage vessels for the first heat exchange fluid when the fourth and fifth heat exchangers 52, 56 are not employed in a given mode of operation. The accumulator 28 performs as outlined previously. The gaseous component of the first heat exchange fluid is introduced into the compressor 32 from the accumulator 28 by way of the low-pressure inlet 76.

Figure 7:
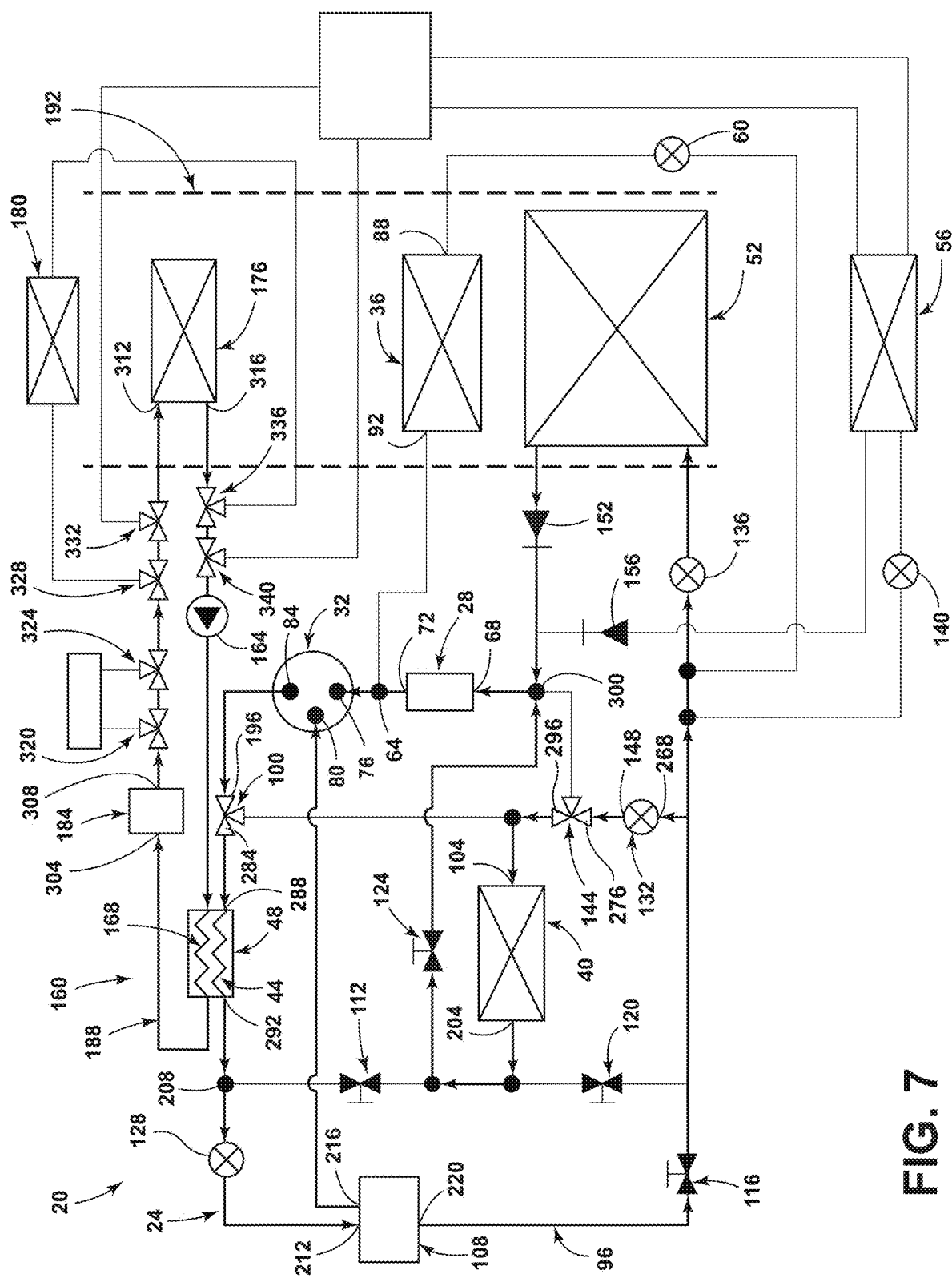
FIG. 7 is a schematic representation of the heat pump arrangement, illustrating a first reheat mode of operation, according to one example.

With specific reference to FIG. 7, from the second shutoff valve 116, the first heat exchange fluid is directed toward the third expansion valve 132. However, in this mode of operation the fourth expansion valve 136 also receives the first heat exchange fluid. Accordingly, a first portion of the first heat exchange fluid is directed toward the third expansion valve 132 in the manner outlined above. A second portion of the first heat exchange fluid passes through the fourth expansion valve 136 and enters the fourth heat exchanger 52. As the interaction between the first heat exchange fluid, the fourth expansion valve 136, and the first check valve 152 has already been described, such description is omitted here for the sake of brevity. In this mode of operation, the first and second portions of the first heat exchange fluid are recombined upstream of the inlet 68 of the accumulator 28. For example, the first and second portions of the first heat exchange fluid can be recombined at a third coupling point 300 that is immediately upstream of the inlet 68 of the accumulator 28. The second check valve 156 prevents back flow toward the fifth heat exchanger 56. Accordingly, the fifth heat exchanger 56 is prevented from becoming a storage vessel for the first heat exchange fluid when the fifth heat exchanger 56 is not employed in a given mode of operation. The accumulator 28 performs as outlined previously. The gaseous component of the first heat exchange fluid is introduced into the compressor 32 from the accumulator 28 by way of the low-pressure inlet 76.

Referring to FIGS. 6-12, various modes of operation of the heat pump 20 that employ the coolant loop 160 are depicted. The pump 164 is activated in these modes of operation such that a second heat exchange fluid is circulated through the components of the coolant loop 160. The second heat exchange fluid is driven from the pump 164 toward the second heat exchanger 48. Accordingly, the second heat exchange fluid thermally interacts with the first heat exchange fluid by way of the second heat exchanger 48. More specifically, the second heat exchange fluid is circulated through the second region 168 of the second heat exchanger 48 while the first heat exchange fluid is circulated through the first region 44 of the second heat exchanger 48. In various examples, the second heat exchange fluid may extract heat from the first heat exchange fluid at the second heat exchanger 48. From the second heat exchanger 48, the second heat exchange fluid is directed to an inlet 304 of the reservoir 184 by the coolant network of conduits 188. The reservoir 184 can accumulate the second heat exchange fluid. An outlet 308 of the reservoir 184 is plumbed to an inlet 312 of the sixth heat exchanger 176 by the coolant network of conduits 188. In various examples, additional components can be included with the coolant loop 160 and plumbed between the outlet 308 of the reservoir 184 and the inlet 312 of the sixth heat exchanger 176, as will be discussed in further detail herein.

Referring again to FIGS. 6-12, an outlet 316 of the sixth heat exchanger 176 is plumbed to the pump 164. Accordingly, as the pump 164 is operated, the second heat exchange fluid is pulled from the reservoir 184 and into the inlet 312 of the sixth heat exchanger 176 in a siphon-like manner. Said another way, operation of the pump 164 may generate a positive pressure at the inlet 304 of the reservoir 184 and a negative pressure at the outlet 308 of the reservoir 184. Therefore, the pressure differential across the reservoir 184 can facilitate the introduction of the second heat exchange fluid into the inlet 312 of the sixth heat exchanger 176. In some examples, additional components can be included with the coolant loop 160 and plumbed between the outlet 316 of the sixth heat exchanger 176 and the pump 164. The second heat exchange fluid can provide heat to a cabin of a vehicle as a result of the fluid communication between the sixth heat exchanger 176 and the ductwork 192. In various examples, the sixth heat exchanger 176 and/or the seventh heat exchanger 180 may operate as a heater core. Alternatively, heat from the second heat exchange fluid may be transferred from the sixth heat exchanger 176 and/or the seventh heat exchanger 180 to components that can benefit from such heat, such as batteries or electrical components during cold weather conditions in the environment within which the vehicle or the heat pump 20 currently occupies at a given time.

Referring further to FIGS. 6-12, in the depicted examples, a third three-way valve 320, a fourth three-way valve 324, a fifth three-way valve 328, and a sixth three-way valve 332 are positioned between the outlet 308 of the reservoir 184 and the inlet 312 of the sixth heat exchanger 176. The third three-way valve 320 is downstream of the outlet 308 of the reservoir and upstream of the fourth three-way valve 324. The fourth three-way valve 324 is downstream of the third three-way valve 320 and upstream of the fifth three-way valve 328. The fifth three-way valve 328 is downstream of the fourth three-way valve 324 and upstream of the sixth three-way valve 332. The sixth three-way valve 332 is downstream of the fifth three-way valve 328 and upstream of the inlet 312 of the sixth heat exchanger 176. Additionally, in the depicted examples, a seventh three-way valve 336 and an eighth three-way valve 340 are positioned between the outlet 316 of the sixth heat exchanger 176 and the pump 164. The seventh three-way valve 336 is downstream of the outlet 316 of the sixth heat exchanger 176 and upstream of the eighth three-way valve 340. The eighth three-way valve 340 is downstream of the seventh three-way valve 336 and upstream of the pump 164.

Figure 6:
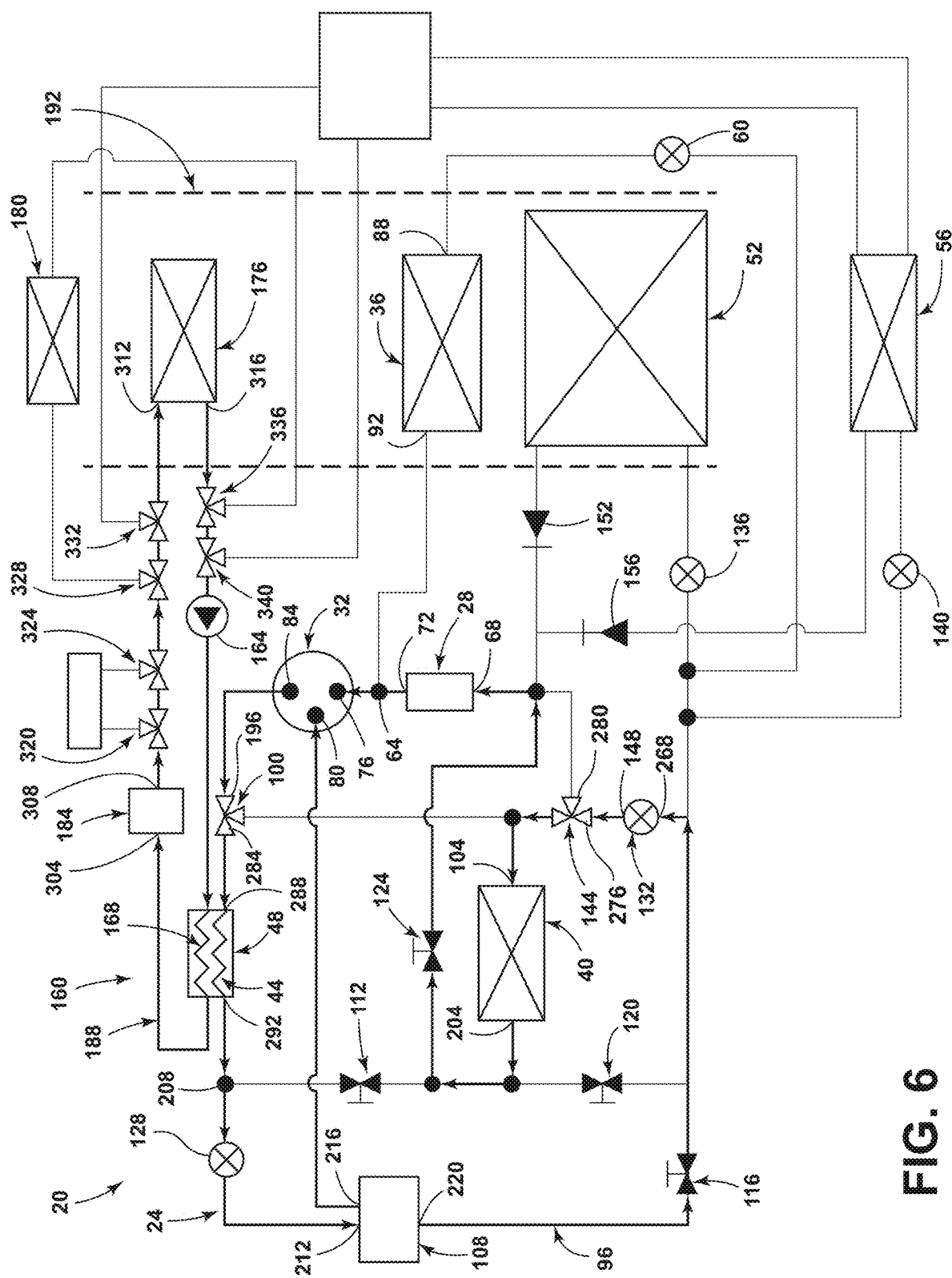
FIG. 6 is a schematic representation of the heat pump arrangement, illustrating a first cabin heating mode of operation, according to one example.

With particular reference to FIGS. 6 and 7, the third three-way valve 320 is placed in a position that directs the second heat exchange fluid to flow through the third three-way valve 320 and immediately on toward the fourth three-way valve 324. The fourth three-way valve 324 is placed in a position that receives the second heat exchange fluid from the third three-way valve 320 and directs the second heat exchange fluid on toward the fifth three-way valve 328. The fifth three-way valve 328 is placed in a position such that the second heat exchange fluid is received from the fourth three-way valve 324 and directed toward the sixth three-way valve 332. The sixth three-way valve 332 receives the second heat exchange fluid from the fifth three-way valve 328 and directs the second heat exchange fluid on toward the inlet 312 of the sixth heat exchanger 176. The sixth heat exchanger 176 performs as described herein. The second heat exchange fluid exits the sixth heat exchanger 176 by way of the outlet 316 thereof. From the outlet 316 of the sixth heat exchanger 176, the second heat exchange fluid is directed toward the seventh three-way valve 336. The seventh three-way valve 336 is placed in a position such that the second heat exchange fluid is received by the seventh three-way valve 336 and directed toward the eighth three-way valve 340. The eighth three-way valve 340 is placed in a position such that the second heat exchange fluid received by the eighth three-way valve 340 from the seventh three-way valve 336 is directed toward the pump 164.

Figure 8:
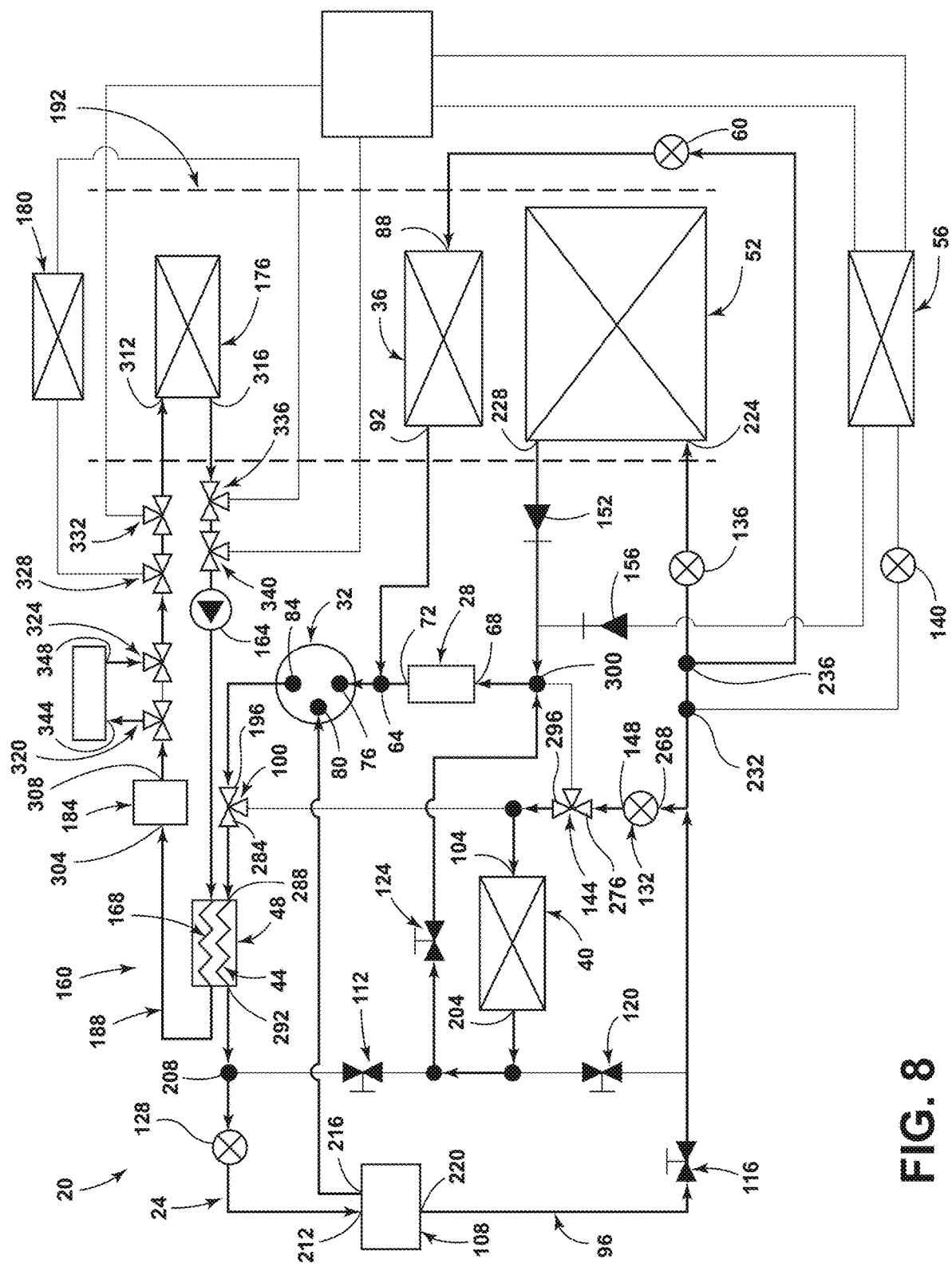
FIG. 8 is a schematic representation of the heat pump arrangement, illustrating a second reheat mode of operation, according to one example.
Figure 12:
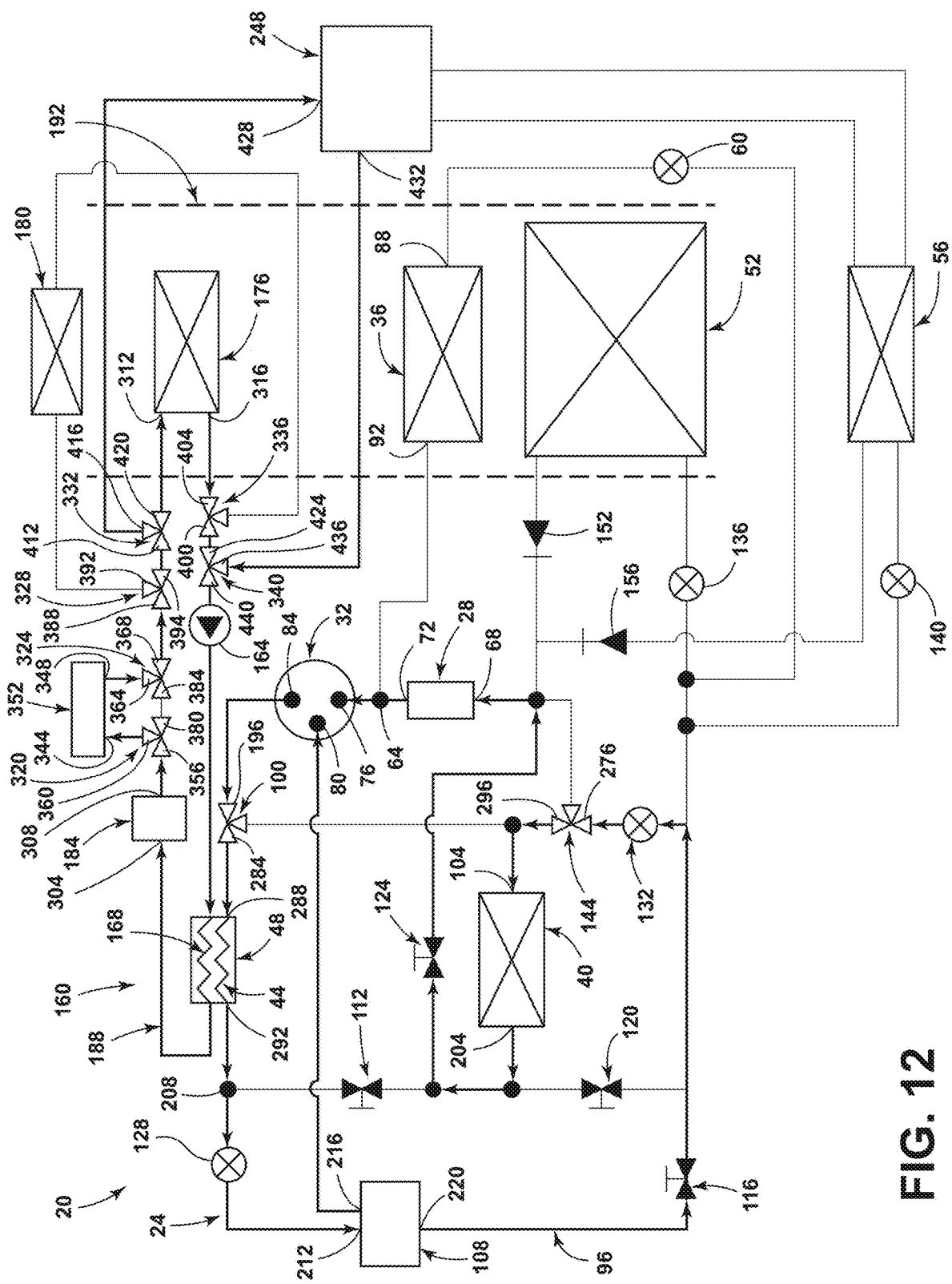
FIG. 12 is a schematic representation of the heat pump arrangement, illustrating a de-ice, cabin heating, and battery heating mode of operation, according to one example.

Referring now to FIGS. 8 and 12, the third three-way valve 320 and the fourth three-way valve 324 are plumbed to an inlet 344 and an outlet 348 of a second heat-producing component 352, respectively, as will be discussed in further detail herein. In the depicted examples, the second heat exchange fluid exits the outlet 308 of the reservoir 184 and is received at a first port 356 of the third three-way valve 320. Based on a positioning of the third three-way valve 320, the second heat exchange fluid that is received at the first port 356 of the third three-way valve 320 is directed to exit the third three-way valve 320 by way of a second port 360. From the second port 360 of the third three-way valve 320, the second heat exchange fluid is directed to the inlet 344 of the second heat-producing component 352. The second heat-producing component 352 can be an engine, electronics, battery, battery pack, one or more heating elements, brakes, or the like. After interacting with the second heat-producing component 352, the second heat exchange fluid exits the second heat-producing component 352 by way of the outlet 348 thereof. As a result of interaction with the second heat-producing component 352, the second heat exchange fluid that exits by way of the outlet 348 may have a greater pressure and/or a greater temperature than the second heat exchange fluid that entered by way of the inlet 344. From the outlet 348 of the second heat-producing component 352, the second heat exchange fluid is directed to a first port 364 of the fourth three-way valve 324. Based upon a positioning of the fourth three-way valve 324, the second heat exchange fluid received at the first port 364 is directed to exit the fourth three-way valve 324 by way of a second port 368 thereof.

Referring to FIGS. 9-11, the fifth three-way valve 328 is plumbed to an inlet 372 of the seventh heat exchanger 180 and the seventh three-way valve 336 is plumbed to an outlet 376 of the seventh heat exchanger 180. More specifically, the fifth three-way valve 328 is upstream of the inlet 372 of the seventh heat exchanger 180 and the seventh three-way valve 336 is downstream of the outlet 376 of the seventh heat exchanger 180. From the outlet 308 of the reservoir 184, the second heat exchange fluid is directed to the first port 356 of the third three-way valve 320. Based upon the positioning of the third three-way valve 320 in these modes of operation, the second heat exchange fluid received at the first port 356 is directed to exit the third three-way valve 320 by way of a third port 380. Similarly, from the third port 380 of the third three-way valve 320, the second heat exchange fluid is directed to a third port 384 of the fourth three-way valve 324. Based upon the positioning of the fourth three-way valve 324, the second heat exchange fluid received at the third port 384 is directed to exit the fourth three-way valve 324 by way of the second port 368 thereof. From the second port 368 of the fourth three-way valve 324, the second heat exchange fluid is directed to a first port 388 of the fifth three-way valve 328. The positioning of the fifth three-way valve 328 in the depicted modes of operation is such that the second heat exchange fluid received at the first port 388 of the fifth three-way valve 328 is split into a first portion and a second portion. The first portion of the second heat exchange fluid is directed to exit the fifth three-way valve 328 by way of a second port 392 thereof. The second portion of the second heat exchange fluid is directed to exit the fifth three-way valve 328 by way of a third port 394 thereof. The second portion of the second heat exchange fluid that exits the fifth three-way valve 328 by way of the third port 394 proceeds to the inlet 312 of the sixth heat exchanger 176. The sixth heat exchanger 176 performs as already described.

Referring again to FIGS. 9-11, from the second port 392 of the fifth three-way valve 328, the first portion of the second heat exchange fluid is directed to the inlet 372 of the seventh heat exchanger 180. The seventh heat exchanger 180 can provide heat to one or more components of the vehicle. After interacting with the seventh heat exchanger 180, the first portion of the second heat exchange fluid exits the seventh heat exchanger 180 by way of the outlet 376. From the outlet 376 of the seventh heat exchanger 180, the first portion of the second heat exchange fluid is directed toward a first port 396 of the seventh three-way valve 336. Based upon the positioning of the seventh three-way valve 336 in the depicted modes of operation, the second heat exchange fluid received at the first port 396 is directed to exit the seventh three-way valve 336 by way of a second port 400 thereof. A third port 404 of the seventh three-way valve 336 receives the second portion of the second heat exchange fluid that interacted with the sixth heat exchanger 176. The first and second portions of the second heat exchange fluid are recombined at the seventh three-way valve 336. The second heat exchange fluid exits the seventh three-way valve 336 and is directed toward the pump 164.

Referring now to FIG. 12, from the second port 368 of the fourth three-way valve 324, the second heat exchange fluid is directed to the first port 388 of the fifth three-way valve 328. Based upon the positioning of the fifth three-way valve 328 in this mode of operation, the second heat exchange fluid received at the first port 388 is directed to exit the fifth three-way valve 328 by way of the third port 394 thereof. After exiting the third port 394 of the fifth three-way valve 328, the second heat exchange fluid is directed to a first port 412 of the sixth three-way valve 332. The positioning of the sixth three-way valve 332 in this mode of operation is such that the second heat exchange fluid received at the first port 412 is directed to exit the sixth three-way valve 332 by way of a second port 416 and a third port 420 thereof. Accordingly, at the sixth three-way valve 332, the second heat exchange fluid is separated into a first portion and a second portion. The first portion of the second heat exchange fluid is directed out of the third port 420 and the second portion of the second heat exchange fluid is directed out of the second port 416. The first portion is directed toward the inlet 312 of the sixth heat exchanger 176 and interacts with the sixth heat exchanger 176 in the manner already described. After exiting the sixth heat exchanger 176 by way of the outlet 316 thereof, the first portion passes through the seventh three-way valve 336 by entering the third port 404 and exiting the second port 400 thereof. From the second port 400 of the seventh three-way valve 336, the first portion of the second heat exchange fluid is directed to a first port 424 of the eighth three-way valve 340.

Referring again to FIG. 12, the second portion of the second heat exchange fluid exits the sixth three-way valve 332 by way of the second port 416. From the second port 416 of the sixth three-way valve 332, the second portion of the second heat exchange fluid is directed toward a second inlet 428 of the first heat-producing component 248. The second inlet 428 of the first heat-producing component 248 can be immediately downstream of the second port 416 of the sixth three-way valve 332. The second heat exchange fluid received at the second inlet 428 exits the first heat-producing component 248 by way of a second outlet 432 thereof. The second heat exchange fluid increases in temperature, pressure, and/or vapor percentage as a result of interaction with the first heat-producing component 248. Upon exiting the second outlet 432 of the first heat-producing component 248, the second portion of the second heat exchange fluid is directed to a second port 436 of the eighth three-way valve 340. At the eighth three-way valve 340, the first and second portions of the second heat exchange fluid are recombined and directed to exit the eighth three-way valve 340 by way of a third port 440 thereof. From the third port 440 of the eighth three-way valve 340, the second heat exchange fluid is directed toward the pump 164, thereby completing traversal of the coolant loop 160.

Referring to FIGS. 1-12, in the depicted example, the second heat-producing component 352 is plumbed in series with the sixth heat exchanger 176, the seventh heat exchanger 180, and the first heat-producing component 248. The sixth heat exchanger 176 is plumbed in parallel with the seventh heat exchanger 180 and the first heat-producing component 248. The first heat-producing component 248 is plumbed in parallel with the sixth heat exchanger 176 and the seventh heat exchanger 180.

Figure 13:
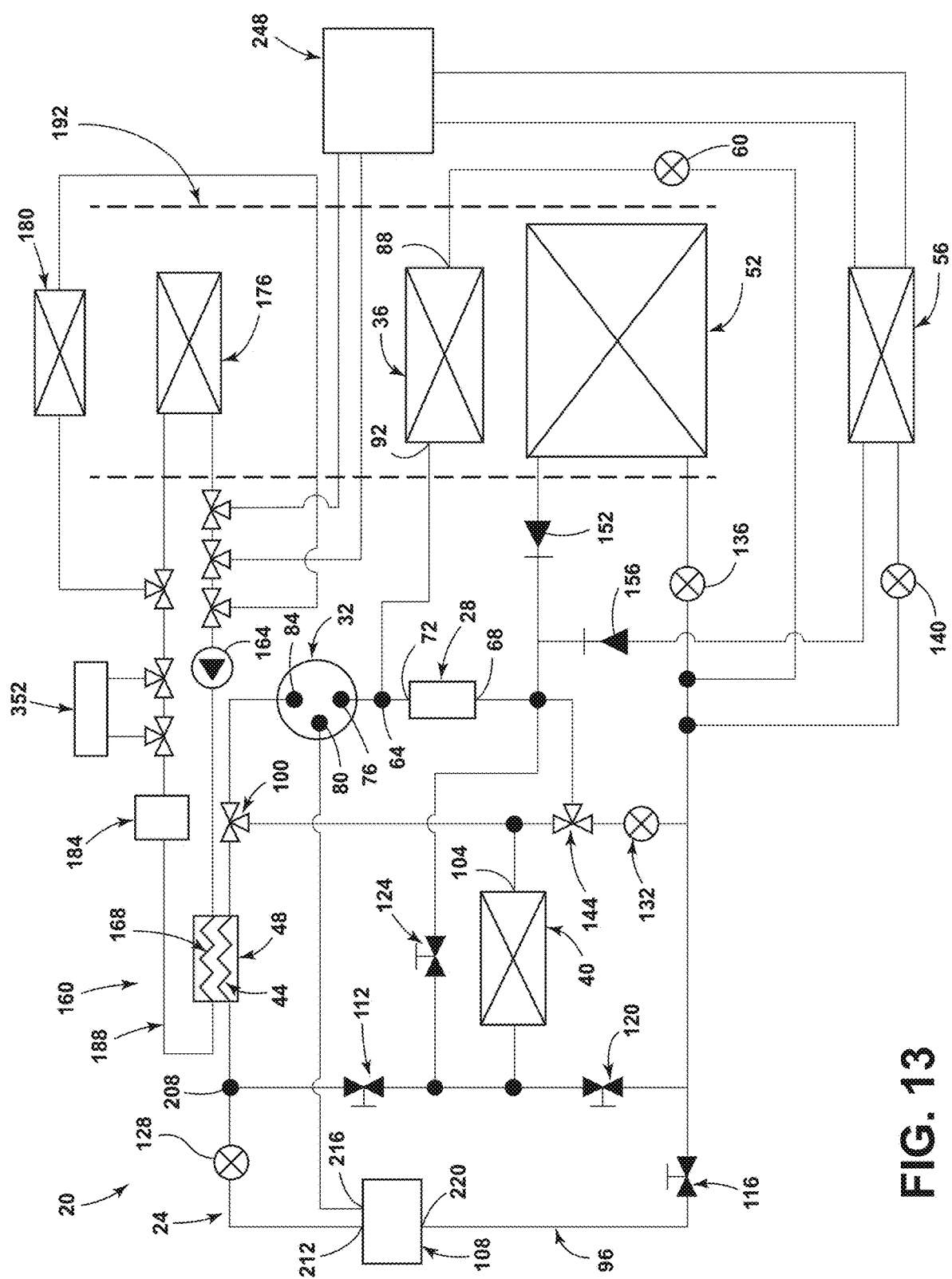
FIG. 13 is a schematic representation of a heat pump arrangement, illustrating a refrigerant loop and a coolant loop, according to another example.
Figure 14:
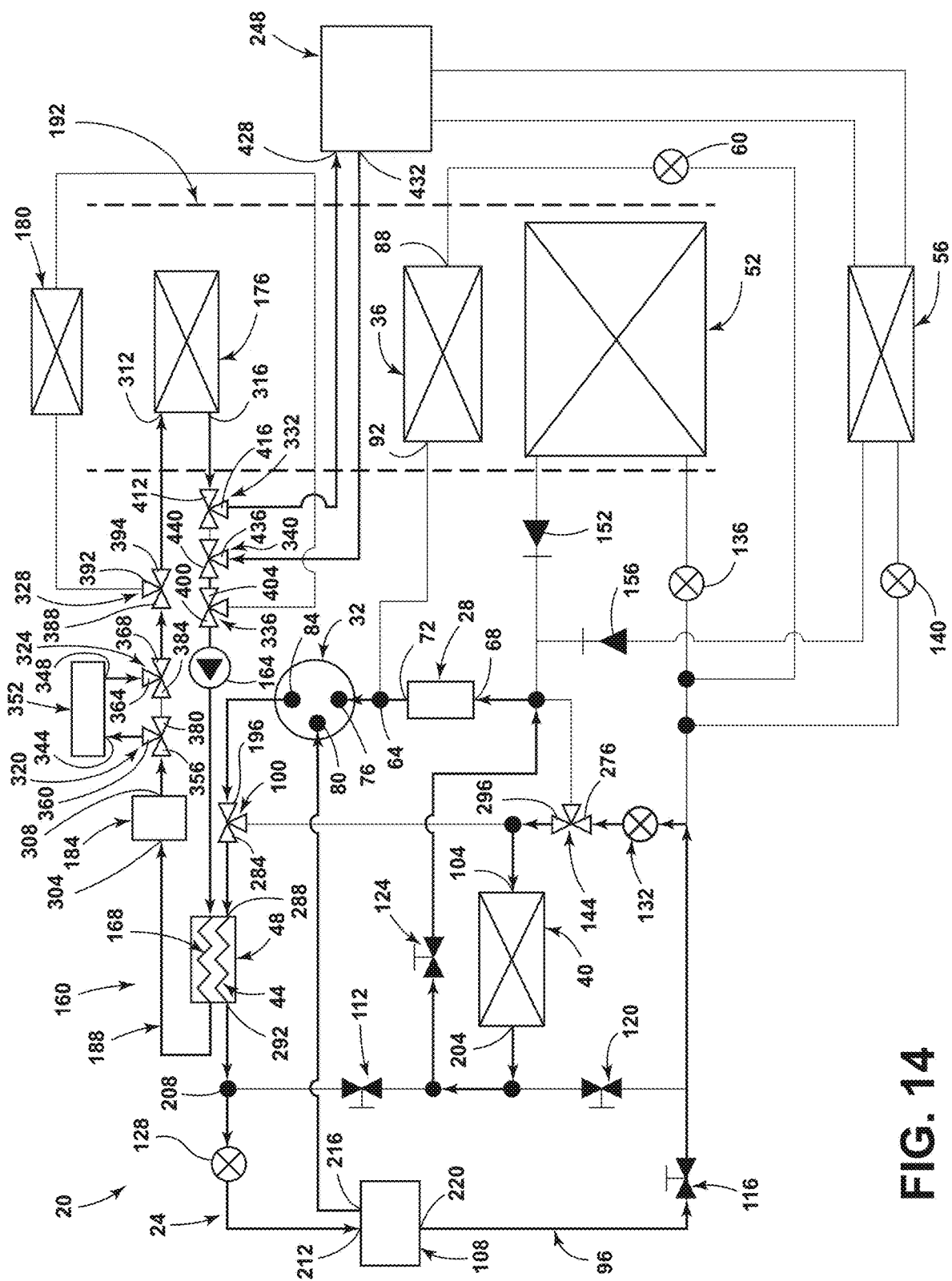
FIG. 14 is a schematic representation of the heat pump arrangement, illustrating an in-series cabin and battery heating mode of operation, according to one example.

Referring now to FIGS. 13 and 14, in the depicted example, the second heat-producing component 352 is plumbed in series with the sixth heat exchanger 176, the seventh heat exchanger 180, and the first heat-producing component 248. The sixth heat exchanger 176 is plumbed in parallel with the seventh heat exchanger 180. The sixth heat exchanger 176 is plumbed in series with the first heat-producing component 248. The first heat-producing component 248 is plumbed in parallel with the seventh heat exchanger 180.

With specific reference to FIG. 14, the flow of the first heat exchange fluid within the refrigerant loop 24 has been described above and is omitted here for the sake of brevity. The pump 164 is activated in this mode of operation such that the second heat exchange fluid is circulated through the components of the coolant loop 160. The second heat exchange fluid is driven from the pump 164 toward the second heat exchanger 48. Accordingly, the second heat exchange fluid thermally interacts with the first heat exchange fluid by way of the second heat exchanger 48. More specifically, the second heat exchange fluid is circulated through the second region 168 of the second heat exchanger 48 while the first heat exchange fluid is circulated through the first region 44 of the second heat exchanger 48. In various examples, the second heat exchange fluid may extract heat from the first heat exchange fluid at the second heat exchanger 48. From the second heat exchanger 48, the second heat exchange fluid is directed to the inlet 304 of the reservoir 184 by the coolant network of conduits 188. The reservoir 184 can accumulate the second heat exchange fluid. The outlet 308 of the reservoir 184 is plumbed to the inlet 312 of the sixth heat exchanger 176 by the coolant network of conduits 188. In various examples, additional components can be included with the coolant loop 160 and plumbed between the outlet 308 of the reservoir 184 and the inlet 312 of the sixth heat exchanger 176, as will be discussed in further detail herein.

Referring again to FIG. 14, the outlet 316 of the sixth heat exchanger 176 is plumbed to the pump 164. Accordingly, as the pump 164 is operated, the second heat exchange fluid can be pulled from the reservoir 184 and into the inlet 312 of the sixth heat exchanger 176 in a siphon-like manner. Said another way, operation of the pump 164 may generate a positive pressure at the inlet 304 of the reservoir 184 and a negative pressure at the outlet 308 of the reservoir 184. Therefore, the pressure differential across the reservoir 184 can facilitate the introduction of the second heat exchange fluid into the inlet 312 of the sixth heat exchanger 176. In some examples, additional components can be included with the coolant loop 160 and plumbed between the outlet 316 of the sixth heat exchanger 176 and the pump 164. The second heat exchange fluid can provide heat to a cabin of a vehicle as a result of the fluid communication between the sixth heat exchanger 176 and the ductwork 192. For example, the sixth heat exchanger 176 may operate as a heater core. Alternatively, heat from the second heat exchange fluid may be transferred from the sixth heat exchanger 176 to components that can benefit from such heat, such as batteries or electrical components during cold weather conditions in the environment within which the vehicle or the heat pump 20 currently occupies at a given time.

Referring further to FIG. 14, in the depicted example, the third three-way valve 320, the fourth three-way valve 324, and the fifth three-way valve 328 are positioned between the outlet 308 of the reservoir 184 and the inlet 312 of the sixth heat exchanger 176. The third three-way valve 320 is downstream of the outlet 308 of the reservoir and upstream of the fourth three-way valve 324. The fourth three-way valve 324 is downstream of the third three-way valve 320 and upstream of the fifth three-way valve 328. The fifth three-way valve 328 is downstream of the fourth three-way valve 324 and upstream of the inlet 312 of the sixth heat exchanger 176. Additionally, in the depicted examples, the sixth three-way valve 332, the seventh three-way valve 336, and the eighth three-way valve 340 are positioned between the outlet 316 of the sixth heat exchanger 176 and the pump 164. The sixth three-way valve 332 is downstream of the outlet 316 of the sixth heat exchanger 176 and upstream of the seventh three-way valve 336. The eighth three-way valve 340 is downstream of the sixth three-way valve 332 and upstream of the seventh three-way valve 336. The seventh three-way valve 336 is downstream of the eighth three-way valve 340 and upstream of the pump 164.

Referring still further to FIG. 14, the third three-way valve 320 and the fourth three-way valve 324 are plumbed to the inlet 344 and the outlet 348 of the second heat-producing component 352, respectively. In the depicted example, the second heat exchange fluid exits the outlet 308 of the reservoir 184 and is received at the first port 356 of the third three-way valve 320. Based on a positioning of the third three-way valve 320, the second heat exchange fluid that is received at the first port 356 of the third three-way valve 320 is directed to exit the third three-way valve 320 by way of the second port 360. From the second port 360 of the third three-way valve 320, the second heat exchange fluid is directed to the inlet 344 of the second heat-producing component 352. The second heat-producing component 352 can be an engine, electronics, battery, battery pack, one or more heating elements, brakes, or the like. After interacting with the second heat-producing component 352, the second heat exchange fluid exits the second heat-producing component 352 by way of the outlet 348 thereof. As a result of interaction with the second heat-producing component 352, the second heat exchange fluid that exits by way of the outlet 348 may have a greater pressure and/or a greater temperature than the second heat exchange fluid that entered by way of the inlet 344. From the outlet 348 of the second heat-producing component 352, the second heat exchange fluid is directed to the first port 364 of the fourth three-way valve 324. Based upon a positioning of the fourth three-way valve 324, the second heat exchange fluid received at the first port 364 is directed to exit the fourth three-way valve 324 by way of the second port 368 thereof.

Referring yet again to FIG. 14, from the second port 368 of the fourth three-way valve 324, the second heat exchange fluid is directed to the first port 388 of the fifth three-way valve 328. The positioning of the fifth three-way valve 328 in the depicted mode of operation is such that the second heat exchange fluid received at the first port 388 of the fifth three-way valve 328 is directed to exit the fifth three-way valve 328 by way of the third port 394. The second heat exchange fluid proceeds to the inlet 312 of the sixth heat exchanger 176 from the third port 394 of the fifth three-way valve 328. The sixth heat exchanger 176 performs as already described. After exiting the sixth heat exchanger 176 by way of the outlet 316 thereof, the second heat exchange fluid is directed to the first port 412 of the sixth three-way valve 332. The positioning of the sixth three-way valve 332 in this mode of operation is such that the second heat exchange fluid received at the first port 412 is directed to exit the sixth three-way valve 332 at the second port 416. From the second port 416, the second heat exchange fluid is directed to the second inlet 428 of the first heat-producing component 248. The second inlet 428 of the first heat-producing component 248 can be immediately downstream of the second port 416 of the sixth three-way valve 332. The second heat exchange fluid received at the second inlet 428 exits the first heat-producing component 248 by way of the second outlet 432 thereof. The second heat exchange fluid increases in temperature, pressure, and/or vapor percentage as a result of interaction with the second heat-producing component 248. Upon exiting the second outlet 432 of the second heat-producing component 248, the second heat exchange fluid is directed to the second port 436 of the eighth three-way valve 340. At the eighth three-way valve 340, the second heat exchange fluid is directed to exit the eighth three-way valve 340 by way of the third port 440 thereof. From the third port 440 of the eighth three-way valve 340, the second heat exchange fluid is directed to the third port 404 of the seventh three-way valve 336. The positioning of the seventh three-way valve 336 in this mode of operation is such that the second heat exchange fluid received at the third port 404 is directed to exit the seventh three-way valve 336 by way of the second port 400 thereof. From the second port 400 of the seventh three-way valve 336, the second heat exchange fluid is directed toward the pump 164, thereby completing traversal of the coolant loop 160.

The present disclosure has discussed a variety of modes of operation and various examples for the heat pump 20. While specific examples of the heat pump 20 and specific examples of the modes of operation of such heat pumps 20 have been discussed in detail, the present disclosure is not limited to the arrangements of the heat pump 20 discussed herein. Similarly, the present disclosure is not limited to the modes of operation discussed herein. Rather, the present disclosure provides exemplary discussion of the operation of the various components of the heat pumps 20 that may inform additional modes of operation and/or arrangements that are not explicitly articulated herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
a refrigerant loop comprising:
   an accumulator having an inlet and an outlet;
   a compressor having a low-pressure inlet, a mid-pressure inlet, and an outlet, wherein the low-pressure inlet is downstream of the outlet of the accumulator;
   a first heat exchanger having an inlet and an outlet;
   a first expansion valve positioned immediately upstream of the inlet of the first heat exchanger;
   a second heat exchanger;
   a first region of a third heat exchanger;
   a fourth heat exchanger;
   a fifth heat exchanger; and
   a first coupling point positioned immediately downstream of the outlet of the accumulator and immediately upstream of the low-pressure inlet of the compressor, wherein the first coupling point is immediately downstream of the outlet of the first heat exchanger such that a first heat exchange fluid circulating through the refrigerant loop is directed to the low-pressure inlet of the compressor upon exiting the outlet of the first heat exchanger, and wherein the first heat exchange fluid that exits the outlet of the first heat exchanger bypasses the accumulator.

2. The heat pump of claim 1, wherein the refrigerant loop further comprises:
   a vapor generator positioned downstream of the outlet of the compressor and upstream of both the low-pressure inlet and the mid-pressure inlet; and
   a second expansion valve positioned upstream of the vapor generator.

3. The heat pump of claim 2, wherein the refrigerant loop further comprises:
   a first shutoff valve plumbed in series with the second heat exchanger, wherein the first shutoff valve is positioned downstream of the second heat exchanger;
   a second shutoff valve plumbed in series with the vapor generator, wherein the second shutoff valve is positioned downstream of the vapor generator;
   a third shutoff valve plumbed in series with the second heat exchanger, wherein the third shutoff valve is positioned downstream of the second heat exchanger; and
   a fourth shutoff valve plumbed in series with the second heat exchanger, wherein the fourth shutoff valve is positioned downstream of the second heat exchanger.

4. The heat pump of claim 1, wherein the refrigerant loop further comprises:
   a first three-way valve positioned downstream of the outlet of the compressor and upstream of an inlet of the second heat exchanger, wherein the first three-way valve is positioned upstream of the first region of the third heat exchanger;
   a third expansion valve positioned upstream of the inlet of the second heat exchanger; and
   a second three-way valve positioned immediately downstream of the third expansion valve, wherein the second three-way valve is positioned upstream of the second heat exchanger.

5. The heat pump of claim 1, further comprising:
a coolant loop comprising:
   a second region of the third heat exchanger;
   a pump;
   a sixth heat exchanger;
   a seventh heat exchanger;
   a reservoir; and
   a coolant network of conduits that fluidly couples components of the coolant loop.

6. The heat pump of claim 1, further comprising:
a network of conduits fluidly coupling the accumulator, the compressor, and the first heat exchanger.

7. The heat pump of claim 6, wherein the first coupling point is in the network of conduits.

8. The heat pump of claim 7, wherein the first coupling point joins at least three conduits in the network of conduits.

9. The heat pump of claim 1, wherein the heat pump is for a vehicle.

10. A heat pump for a vehicle, the heat pump comprising:
a refrigerant loop comprising:
   an accumulator having an inlet and an outlet;
   a compressor having a low-pressure inlet, a mid-pressure inlet, and an outlet, wherein the low-pressure inlet is downstream of the outlet of the accumulator;
   a first heat exchanger having an inlet and an outlet;
   a network of conduits fluidly coupling the accumulator, the compressor, and the first heat exchanger;
   a first expansion valve positioned immediately upstream of the inlet of the first heat exchanger;
   a second heat exchanger;
   a first region of a third heat exchanger;
   a fourth heat exchanger;
   a fifth heat exchanger; and
   a first coupling point joining at least three conduits in the network of conduits and positioned immediately downstream of the outlet of the accumulator and immediately upstream of the low-pressure inlet of the compressor, wherein the first coupling point is immediately downstream of the outlet of the first heat exchanger such that a first heat exchange fluid circulating through the refrigerant loop is directed to the low-pressure inlet of the compressor upon exiting the outlet of the first heat exchanger, and wherein the first heat exchange fluid that exits the outlet of the first heat exchanger bypasses the accumulator.

11. The heat pump of claim 10, wherein the refrigerant loop further comprises:
   a vapor generator positioned downstream of the outlet of the compressor and upstream of both the low-pressure inlet and the mid-pressure inlet; and
   a second expansion valve positioned upstream of the vapor generator.

12. The heat pump for a vehicle of claim 11, wherein the refrigerant loop further comprises:
   a first shutoff valve plumbed in series with the second heat exchanger, wherein the first shutoff valve is positioned downstream of the second heat exchanger;
   a second shutoff valve plumbed in series with the vapor generator, wherein the second shutoff valve is positioned downstream of the vapor generator;
   a third shutoff valve plumbed in series with the second heat exchanger, wherein the third shutoff valve is positioned downstream of the second heat exchanger; and
   a fourth shutoff valve plumbed in series with the second heat exchanger, wherein the fourth shutoff valve is positioned downstream of the second heat exchanger.

13. The heat pump for a vehicle of claim 10, wherein the refrigerant loop further comprises:
- a first three-way valve positioned downstream of the outlet of the compressor and upstream of an inlet of the second heat exchanger, wherein the first three-way valve is positioned upstream of the first region of the third heat exchanger;
- a third expansion valve positioned upstream of the inlet of the second heat exchanger; and
- a second three-way valve positioned immediately downstream of the third expansion valve, wherein the second three-way valve is positioned upstream of the second heat exchanger.

14. The heat pump for a vehicle of claim 10, further comprising:
- a coolant loop comprising:
  - a second region of the third heat exchanger;
  - a pump;
  - a sixth heat exchanger;
  - a seventh heat exchanger;
  - a reservoir; and
  - a coolant network of conduits that fluidly couples components of the coolant loop.

* * * * *